United States Patent
Katayama et al.

(10) Patent No.: US 6,651,212 B1
(45) Date of Patent: Nov. 18, 2003

(54) RECORDING/REPRODUCTION DEVICE, SEMICONDUCTOR MEMORY, AND MEMORY CARD USING THE SEMICONDUCTOR MEMORY

(75) Inventors: Yukari Katayama, Chigasaki (JP); Kazuo Nakamura, Fussa (JP)

(73) Assignee: Hitachi, Ltd., Tokyo (JP)

( * ) Notice: Subject to any disclaimer, the term of this patent is extended or adjusted under 35 U.S.C. 154(b) by 292 days.

(21) Appl. No.: 09/653,586

(22) Filed: Aug. 31, 2000

(30) Foreign Application Priority Data

Dec. 16, 1999 (JP) ............................. 11-357349

(51) Int. Cl.⁷ .............................................. G11C 29/00
(52) U.S. Cl. ........................................................ 714/763
(58) Field of Search ................................. 714/746, 758, 714/763, 773, 782

(56) References Cited

U.S. PATENT DOCUMENTS

| | | | |
|---|---|---|---|
| 5,233,610 A | * 8/1993 | Nakayama et al. | 714/704 |
| 5,559,644 A | * 9/1996 | Ozaki et al. | 360/48 |
| 5,724,285 A | * 3/1998 | Shinohara | 365/185.25 |
| 5,754,567 A | * 5/1998 | Norman | 714/773 |
| 5,848,076 A | * 12/1998 | Yoshimura | 714/763 |
| 5,958,079 A | * 9/1999 | Yoshimura | 714/766 |
| 5,961,660 A | * 10/1999 | Capps, Jr. et al. | 714/763 |
| 6,256,762 B1 | * 7/2001 | Beppu | 714/763 |
| 6,282,624 B1 | 8/2001 | Kimura et al. | |

FOREIGN PATENT DOCUMENTS

| | | |
|---|---|---|
| JP | 1155721 | 6/1989 |
| JP | 35995 | 1/1991 |

* cited by examiner

Primary Examiner—Albert Decady
Assistant Examiner—Shelly A Chase
(74) Attorney, Agent, or Firm—Antonelli, Terry, Stout & Kraus, LLP

(57) ABSTRACT

An ECC circuit implements a first error correction using a first BCH connection code and flash memory chips implement a second error connection using a second BCH error correction code which uses the same Galois filed. A controller implements error detection based on the first error correction code and using the information provided by the flash memory chip. Upon detecting error, the controller cancles the result of the second error correction made by the flash memory chip based on correction information and information of the error position and error value provided by the flash memory chip. The controller calculates the error position and error value by using the syndrome of the second error correction code derived from the information of computation and the syndrome of first error connection code and implements error correction for the related data based on the calculated error position and error value.

22 Claims, 12 Drawing Sheets

RECORDING/REPRODUCTION DEVICE, SEMICONDUCTOR MEMORY, AND MEMORY CARD USING THE SEMICONDUCTOR MEMORY

BACKGROUND OF THE INVENTION

1. Field of the Invention

The present invention relates to a recording/reproduction device, semiconductor memory, and memory card using the semiconductor memory, and particularly to a recording/reproduction device which utilizes both of the error correcting ability of the semiconductor memory and the error correcting ability of the controller of the device. According to the present invention, the process can be simplified even in case the semiconductor memory of a device has a unit data size of erasure larger than the unit data size of processing by the device. The inventive recording/reproduction device is fairly reliable and is inexpensive.

2. Description of the Prior Art

A flash memory disk which is an example of recording/reproduction devices using non-volatile semiconductor memories is made up of flash memory chips, an interface chip, a microprocessor, etc. as shown in FIG. 1 of Japanese Patent Unexamined Publication No. H9-305497.

The flash memory chip is liable to have an increased error rate when the write operation exceeds a certain number of times, and therefore it relies on the error correcting function (inclusive of the error detecting function) of the interface chip or microprocessor to retain the reliability of the flash memory disk.

The flash memory chip is also often used as a discrete part. Therefore, the flash memory chip is designed to have an error correcting function by itself so that it has a certain level of reliability, as disclosed in Japanese Patent Unexamined Publication No. H3-5995.

It is known that a variable-length format scheme for a mass magnetic disk system uses a concatenated code to reduce redundant bytes of the error correction code so as to enhance the efficiency of error correction, as disclosed in Japanese Patent Unexamined Publications No. S59-165541, No. S62-73336 and No. H1-155721.

In case flash memory chips having an error correcting function are used for a system, such as a flash memory disk, which is required to be more reliable than the flash memory chips as discrete parts, it is necessary to include a controller having a high-grade error correcting function outside the flash memory chips. It is problematic however in that the use of the error correcting function of the flash memory chip make a miss-correction, resulting in a degraded reliability of the system as the whole, and therefore this error correcting function is not always useful.

For example, when flash memory chips having an error correcting function for dealing with 1-byte errors are used for a system which necessitates the correction of up to 3-byte errors, a controller capable of correcting 3-byte errors is included in the system. A 3-byte error arising in a flash memory chip can be corrected by the controller without using the error correcting function of the flash memory chips. If, on the other hand, correction of the error by the error correcting function of the flash memory chip is attempted, it occasionally make a miss-correction due to the error beyond its ability and convert the 3-byte error into a 4-byte error which is now beyond the ability of the error correcting function of the controller. Consequently, the system becomes incapable of correcting even 3-byte errors.

Nevertheless, leaving the error correcting function of the flash memory chip unused is problematic in that the system has a needlessly large circuit area and is needlessly expensive due to the unused function.

If it is attempted to design a system having a more reliable error correcting function by use of a flash memory chip with an error correcting function as core element, it will be necessary to take a design procedure as shown by the flowchart of FIG. 18A and the block diagram of flash memory chip of FIG. 18B, in which step 1501 removes the error correcting function block 1512 of the flash memory chip 1511, step 1502 redesigns the interface block for the flash memory chip 1511 to make a new flash memory 1513, and step 1503 designs a controller 1514 and an error correcting function block is included in the controller, and in consequence it will be problematic in an increased design work and a rising cost.

Devices of "memory stick" and MMC (Multi-Media Card) have their flash memory chip 1513 and controller 1514 integrated in one chip in order to reduce the size and weight. However, designing these devices also necessitates the procedure shown in FIG. 18A, resulting in an increased design work and rising cost.

Devices of a portable terminal and MPEG camera using a flash memory card (memory card formed of flash memory chips) often adopt a 512-byte unit data size of processing. Whereas, the flash memory chip has a trend of larger unit data sizes of erasure, e.g., 1024 bytes and 2048 bytes, with the intention of reducing circuit scale and speeding up per-byte processing speed. In this case, the error correction code is processed in the large unit data size of erasure.

Accordingly, it is necessary to read out data of 1024 bytes or more which is the unit data size of erasure to check the error correction code at each readout of data of 512 bytes which is the unit data size of processing, and also to read out data of 1024 bytes or more to re-calculate the error correction code at each writing of 512-byte data, resulting in an intricate process.

A high-reliability error correcting function involves high-speed computation, which needs a high-performance controller, and therefore it is expensive. However, flash memory cards used for the portable recording/reproduction device, etc. are required to be inexpensive more than being reliable.

SUMMARY OF THE INVENTION

The present invention is intended to overcome the foregoing prior art deficiencies and facilitate the design of a one chip semiconductor memory system which uses a memory chip core element with its error correcting function being kept active.

An object of the present invention is to provide a recording/reproduction device which uses a semiconductor memory with an error correcting function as core element, and which utilizes the error correcting function of the semiconductor memory and yet is more reliable in error correction than the semiconductor memory, and provide a semiconductor memory and which are useful for the recording/reproduction device.

Another object of the present invention is to provide a semiconductor memory and a memory chip which can simplify the process even in the case of having a unit data size of erasure larger than the unit data size of processing of devices which use these parts.

Still another object of the present invention is to provide a recording/reproduction device which is fairly reliable and is inexpensive.

At a first viewpoint, the present invention resides in a recording/reproduction device comprising a controller section having a first error correction code generator which generates a first error correction code for data put in from the outside, and a first error corrector which implements the error detection and correction by using the first error correction code, and a semiconductor memory section having a second error correction code generator which generates a second error correction code for the first error correction code provided by the controller section, a memory which stores the data from the controller section, a first error correction code check symbol which is the first error correction code, with the data being excluded therefrom, and a second error correction code check symbol which is the second error correction code, with the data and first error correction code check symbol being excluded therefrom, and a second error corrector which implements the error detection and correction by using the data and first and second error correction code check symbols read out of the memory, the second error correction code being a BCH code in the same Galois field as the first error correction code and having a continuous root, the controller section implementing the error correction by using the error correction result provided by the second error corrector.

The present invention also resides in a recording/reproduction device comprising a controller section having an external interface which transacts data with the outside, a first error correction code generator which generates a first error correction code for input data, and a first error corrector which implements the error detection and correction by using the first error correction code, and a semiconductor memory section having a second error correction code generator which generates a second error correction code, which is a BCH code in the same Galois field as the first error correction code and has a continuous root, for the first error correction code provided by the controller section, a memory which stores the data from the controller section, a first error correction code check symbol which is the first error correction code, with the data being excluded therefrom, and a second error correction code check symbol which is the second error correction code, with the data and first error correction code check symbol being excluded therefrom, and a second error corrector which implements the error detection and correction by using the data and first and second error correction code check symbols read out of the memory, the controller section implementing the error correction by using the error correction result provided by the semiconductor memory section.

Furthermore, the present invention resides in a recording/reproduction device comprising a controller section having an external interface which transacts data with the outside, a first error correction code generator which generates a first error correction code for input data, and a first error corrector which implements the error detection and correction by using the first error correction code, and a semiconductor memory section having a second error correction code generator which generates a second error correction code, which is a BCH (Bose-Chaudhuri-Hocquenghem) code on the same Galois field as the first error correction code and has a continuous root, for the data provided by the controller section and a first error correction code check symbol which is the first error correction code, with the data being excluded therefrom, a memory which stores the data, the first error correction code check symbol and a second error correction code check symbol which is the second error correction code, with the data and first error correction code check symbol being excluded therefrom, a second error corrector which implements the error detection and correction by using the data and first and second error correction code check symbols read out of the memory, a correction information indicator which indicates information on whether or not the second error corrector has corrected the data, information of the intermediate error correcting computation and information of the detected error position and error value to the first error corrector, and a data sender which sends the data and first error correction code check symbol read out of the memory or the data corrected by the second error corrector and the first error correction code check symbol to the first error corrector, the first error corrector detecting an error by using the data and first error correction code check symbol provided by the data sender and, if the second error corrector has corrected the data, restoring the error-incorrected data by using the error position and error value and, if error is detected in the restored data and the first error correction code check symbol, implementing the error correction for the restored data by using the first error correction code check symbol and information of computation, and implementing the error detecting an error by using the first error correction code, or, if the second error corrector has failed in data correction, attempting the error correction for the error-incorrected data by using the first error correction code check symbol and information of computation and, if the error correction fails, attempting the error correction for the restored data or the error-incorrected data by using the first error correction code check symbol.

Furthermore, the present invention resides in a semiconductor memory comprising a second error correction code generator which generates a second error correction code, which is a BCH code in the same Galois field as a first error correction code and has a continuous root, for data and a first error correction code check symbol provided by a first error corrector, a memory which stores the data and first and second error correction code check symbols, a second error corrector which implements the error detection and correction by using the data and first and second error correction code check symbols read out of the memory, a correction information indicator which indicates information on whether or not the second error corrector has corrected the data and first error correction code check symbol, information of the intermediate error correcting computation and information of the detected error position and error value to the first error corrector, and a data sender which sends the data and first error correction code check symbol read out of the memory or the data corrected by the second error corrector and first error correction code check symbol to the first error corrector.

In the recording/reproduction device of the first viewpoint, when data is recorded on the device, the controller section generates the first error correction code check symbol, the semiconductor memory section generates the second error correction code check symbol, and the data and first and second error correction code check symbols are stored in the memory. When data is read out of the device, the semiconductor memory section implements the error detection and correction for the data and first error correction code check symbol read out of the memory by using the second error correction code check symbol, and delivers the data and first error correction code check symbol read out of the memory or the corrected data and first error correction code check symbol to the controller section. The controller section implements the error detection for the data provided by the semiconductor memory section by using the first error correction code check symbol and, (1) if error is detected and the semiconductor memory section has corrected the error, the controller section cancels the result of error correction made by the semiconductor memory section and restores the data and first error correction code check symbol read out of the memory. For this process, the semiconductor memory section indicates information on whether or not correction has been done and information of the error position and error value to the controller section. Consequently, even if the semiconductor memory section has made a faulty correction, the controller section is not adversely affected, but can correct the error based on its error correction ability. Otherwise, (2) if error is detected and the semiconductor memory section has not corrected the error, the controller section uses intact the data and first error correction code check symbol read out of the memory. In both cases of (1) and (2), the controller section implements the error correction by using the first and second error correction code. For this process, the semiconductor memory section indicates information on whether or not correction has been done and information of the intermediate error correcting computation to the controller section, and the first and second error correction codes are BCH codes on the same Galois field and have continuous roots, i.e., the first and second error correction codes have continuous "power" in the roots of their generation polynomials. Consequently, both error correcting abilities of the semiconductor memory section and controller section can be utilized to enhance the reliability.

The semiconductor memory section of the first viewpoint can be used suitably for the recording/reproduction device of the first viewpoint.

At a second viewpoint, the present invention resides in a recording/reproduction device comprising a controller section having an external interface which transacts data with the outside, a first error correction code generator which generates a first error correction code for input data, and a first error corrector which implements the error detection and correction by using the first error correction code, and a semiconductor memory section having a second error correction code generator which generates a second error correction code, which is a BCH code on the same Galois field as the first error correction code and has a continuous root, for the first error correction code provided by the controller section, a memory which stores the data from the controller section, a first error correction code check symbol which is the first error correction code, with the data being excluded therefrom, and a second error correction code check symbol which is the second error correction code, with the data and first error correction code check symbol being excluded therefrom, and a second error corrector which implements the error detection and correction by using the data and first and second error correction code check symbols read out of the memory, the controller section, upon detecting an error, implementing the error correction based on the first error correction code check symbol and information of computation provided by the semiconductor memory section, and, upon failing in error correction, implementing the error correction for the data read out of the memory by using the first error correction code check symbol.

Furthermore, the present invention resides in a recording/reproduction device comprising a controller section having an external interface which transacts data with the outside, a first error correction code generator which generates a first error correction code for input data, and a first error corrector which implements the error detection and correction by using the first error correction code, and a semiconductor memory section having a second error correction code generator which generates a second error correction code, which is a BCH code on the same Galois field as the first error correction code and has a continuous root, for the first error correction code provided by the controller section, a memory which stores the data, a first error correction code check symbol which is the first error correction code, with the data being excluded therefrom, and a second error correction code check symbol which is the second error correction code, with the data and first error correction code check symbol being excluded therefrom, a second error corrector which implements the error detection and correction by using the data and first and second error correction code check symbols read out of the memory, a detection/correction information indicator which indicates information on whether or not the second error corrector has detected an error, information on whether or not the data and first error correction code check symbol have been corrected and information of the intermediate error correcting computation to the first error corrector, and a data sender which sends the data and first error correction code check symbol read out of the memory and the data and first error correction code check symbol which are corrected by the second error corrector to the first error corrector, the first error corrector, in case the second error corrector has not detected an error but detected an error in the data read out of the memory by using the first error correction code check symbol, or in case the second error corrector has failed in data correction but detected an error in the data read out of the memory by using the first error correction code check symbol, or in case of detecting an error by using the first error correction code check symbol in the data which has been corrected by the second error corrector, attempting the error correction for the data read out of the memory by using the first error correction code check symbol and information of computation and, if error correction fails, attempting the error correction for the error-incorrected data read out of the memory by using the first error correction code check symbol.

Furthermore, the present invention resides in a semiconductor memory section comprising a second error correction code generator which generates a second error correction code, which is a BCH code on the same Galois field as the first error correction code and has a continuous root, for data and a first error correction code check symbol put in from the outside, a memory which stores the data and first and second correction code check symbols, a second error corrector which implements the error detection and correction by using the data and first and second error correction code check symbols read out of the memory, a detection/correction information indicator which indicates information on whether or not the second error corrector has detected an error, information on whether or not the data and first error correction code check symbol have been corrected and information of the intermediate error correcting computation to the first error corrector, and a data sender which sends the data and first error correction code check symbol read out of the memory and the data and the first error correction code check symbol corrected by the second error corrector to the first error corrector.

In the recording/reproduction device of the second viewpoint, when data is recorded on the device, the controller section generates the first error correction code check symbol, the semiconductor memory section generates the second error correction code check symbol, and the data and first and second error correction code check symbols are stored in the memory. When data is read out of the device, the semiconductor memory section implements the error detection and correction for the data and first error correction code check symbol read out of the memory by using the second error correction code check symbol, and delivers the data and first error correction code check symbol read out of the memory and the corrected data and first error correction code check symbol to the controller section. When the controller section, in case the second error corrector has not detected error but detected error in the data and first error correction code check symbol read out of the memory or in case the second error corrector has failed to correct the data and first error corrected code check symbol but has detected error in the data and first error correction code check symbol read out of the memory, attempts the error correction for the data read out of the memory by using the first error correction code check symbol and information of computation (for this process, semiconductor memory section indicates information on whether or not an error has been detected and information of the intermediate error correcting computation to the controller section, and the first and second error correction codes are BCH codes in the same Galois field and have continuous roots, i.e., the first and second error correction codes have continuous "power" in the roots of their generation polynomials) and, if the error correction fails, implements the error correction for the data read out of the memory by using the first error correction code check symbol. Consequently, both error correcting abilities of the semiconductor memory section and controller section can be utilized to enhance the reliability. In case the second error corrector has corrected the data but an error is detected in the error-corrected data by use of the error-corrected first error correction code check symbol, the controller section implements the error correction for the error-incorrected data read out of the memory by using the error-incorrected first error correction code check symbol and information of computation. For this process, the semiconductor memory section indicates information on whether or not an error has been detected and information of the intermediate error correcting computation to the controller section, and the first and second error correction codes are BCH codes in the same Galois field and have continuous roots, i.e., the first and second error correction codes have continuous "power" in the roots of their generation polynomials. If the error correction fails, the controller section implements the error correction for the error-incorrected data read out of the memory by using the error-incorrected first error correction code check symbol. Consequently, even if the semiconductor memory section has made a faulty correction, the device is not adversely affected by it, and both error correcting abilities of the semiconductor memory section and controller section can be utilized to enhance the reliability.

The semiconductor memory of the second viewpoint can be used suitably for the recording/reproduction device of the second viewpoint.

In regard to the BCH code, it is preferable to use particularly the RS (Reed Solomon) code.

The information of computation is preferably a residual polynomial which is the residue resulting from the division of the code polynomial of the second error correction code by the generation polynomial, or the syndrome resulting from the substitution of the root of the generation polynomial into the code polynomial of the second error correction code.

At a third viewpoint, the present invention resides in a semiconductor memory which performs the error correction-coding in the unit data size of processing and the data erasure in the unit size which is twice or more than the unit data size of processing.

The semiconductor memory of the third viewpoint performs the error correction-coding in the unit data size of processing, and therefore, for example, it does not need to check the error correction code by reading out the whole data of 1024 bytes or more, which is a unit data size of erasure, at every readout of data of 512 bytes which is a unit data size of processing, and it does not need to re-calculate the error correction code by reading out the whole data of 1024 bytes or more, which is the unit data size of erasure, at every rewriting of data of 512 bytes which is the unit data size of processing. Consequently, even in case the application device has a unit data size of erasure larger than the unit data size of processing, the process can be simplified. Having a unit data size of erasure twice or more than the unit data size of processing reduces the circuit scale and increases the per-byte processing speed.

At a fourth viewpoint, the present invention resides in a recording/reproduction device which incorporates a microprocessor having an interface function for data transaction with the outside and a semiconductor memory having an error correcting function.

The recording/reproduction device of the fourth viewpoint is inexpensive owing to the use of a microprocessor for the major component part, and is fairly reliable owing to the presence of the error correcting function in the semiconductor memory.

At a fifth viewpoint, the present invention resides in a memory card comprising a card controller section having a first error correction code generator which generates a first error correction code for data put in from the outside and a first error corrector which implements the error detection and correction by using the first error correction code, a semiconductor memory section having a second error correction code generator which generates a second error correction code for the data and first error correction code provided by the card controller section, a memory which stores the data from the card controller section, a first error correction code check symbol which is the first error correction code, with the data being excluded therefrom, and a second error correction code check symbol which is the second error correction code, with the data and first error correction code check symbol being excluded therefrom, and a second error corrector which implements the error detection and correction by using the data and first and second error correction code check symbols read out of the memory, and a connecting section which transacts data with an external device, the second error correction code being a BCH code in the same Galois field as the first error correction code and having a continuous root, the card controller section implementing the error correction by using the error correction result provided by the second error corrector.

The memory card of the fifth viewpoint achieves the same effectiveness as the recording/reproduction device of the first viewpoint.

At a sixth viewpoint, the present invention resides in a memory card comprising a card controller section having an external interface which transacts data with the outside, a first error correction code generator which generates a first error correction code for input data, and a first error corrector which implements the error detection and correction by using the first error correction code, a semiconductor memory section having a second error correction code generator which generates a second error correction code, which is a BCH code in the same Galois field as the first error correction code and has a continuous root, for the first error correction code provided by the card controller section, a memory which stores the data from the card controller section, a first error correction code check symbol which is the first error correction code, with the data being excluded therefrom, and a second error correction code check symbol which is the second error correction code, with the data and first error correction code check symbol being excluded therefrom, and a second error corrector which implements the error detection and correction by using the data and first and second error correction code check symbols read out of the memory, and a connecting section which transacts data with an external device, the card controller section, upon detecting an error, implementing the error correction based on the first error correction code check symbol and information of computation provided by the semiconductor memory section and, upon failing in error correction, implementing the error correction for the data read out of the memory by using the first error correction code check symbol.

The memory card of the sixth viewpoint achieves the same effectiveness as the recording/reproduction device of the second viewpoint.

These and other features and advantages of the present invention will become apparent from the following detailed description of the preferred embodiments of the invention taken in conjunction with the accompanying drawings.

DESCRIPTION OF THE PREFERRED EMBODIMENTS

Embodiments of this invention will be explained with reference to the drawings. This invention is not confined to these embodiments however.

Initially, an embodiment of the flash memory disk will be explained.

Figure 1:
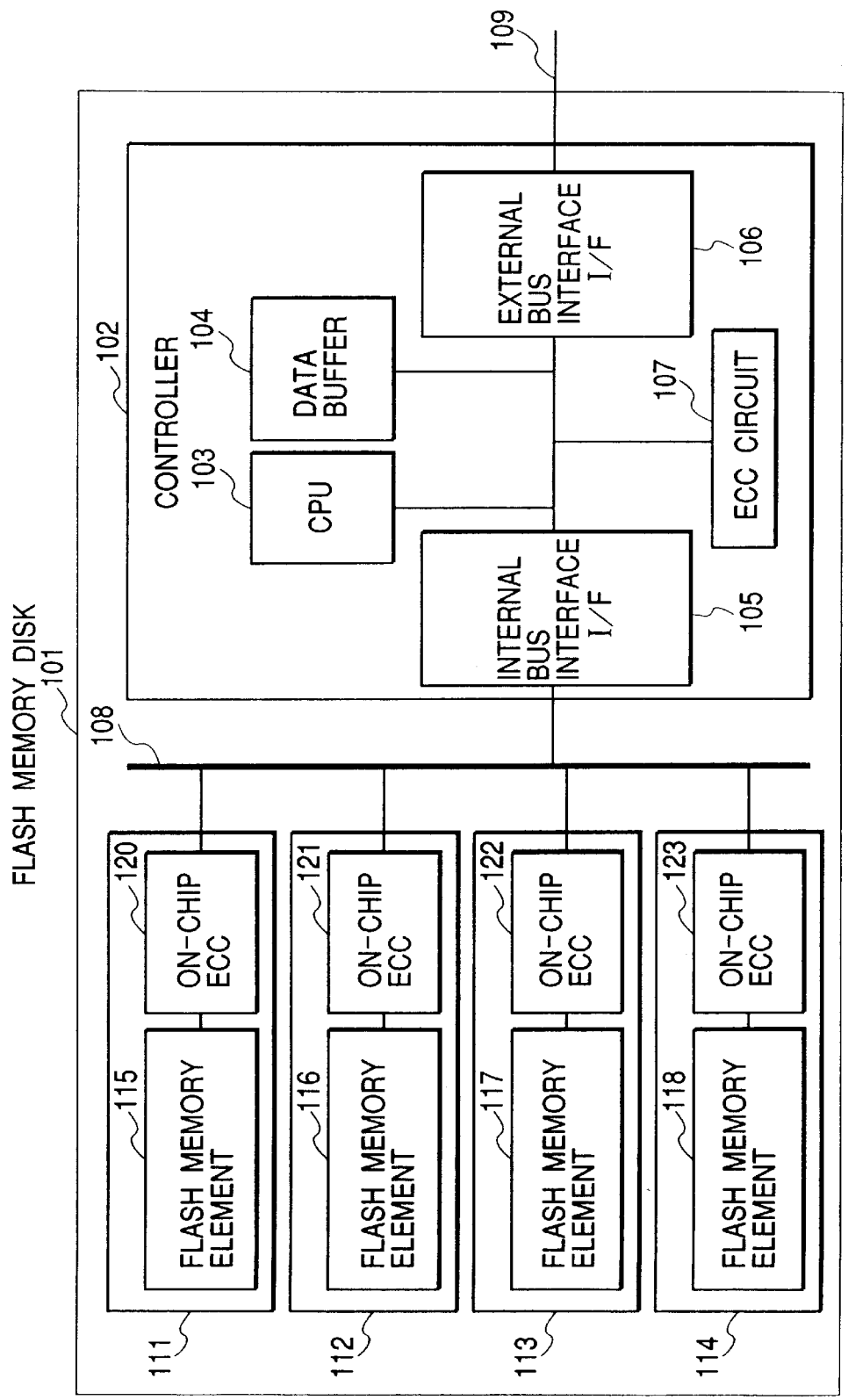
FIG. 1 is a block diagram showing a first embodiment of the flash memory disk based on this invention.

FIG. 1 shows by block diagram a flash memory disk based on this invention. The flash memory disk 101 includes a controller 102, flash memory chips 111–114 and an internal bus 108 which connects these parts.

The controller 102 includes a CPU 103, a data buffer 104, an internal bus interface 105, an external bus interface 106 and an ECC (Error Correction Code) circuit 107. The external bus interface 106 is connected to a usual external interface bus 109 such as the AT bus, PCI bus or SCSI bus. External devices which can be connected through the external interface bus 109 include an MPEG camera, portable terminal unit, and portable music or voice recording/reproduction unit.

The flash memory chips 111–114 are made up of flash memory elements 115–118 and on-chip ECC circuits 120–123, respectively. Each of the on-chip ECC circuits 120–123 has not only a function of correcting errors by generating error correction codes, but also has a function of checking the frequency of error detection so as to move data in an area of high error detection rate to another area of low error detection rate.

Figure 2:
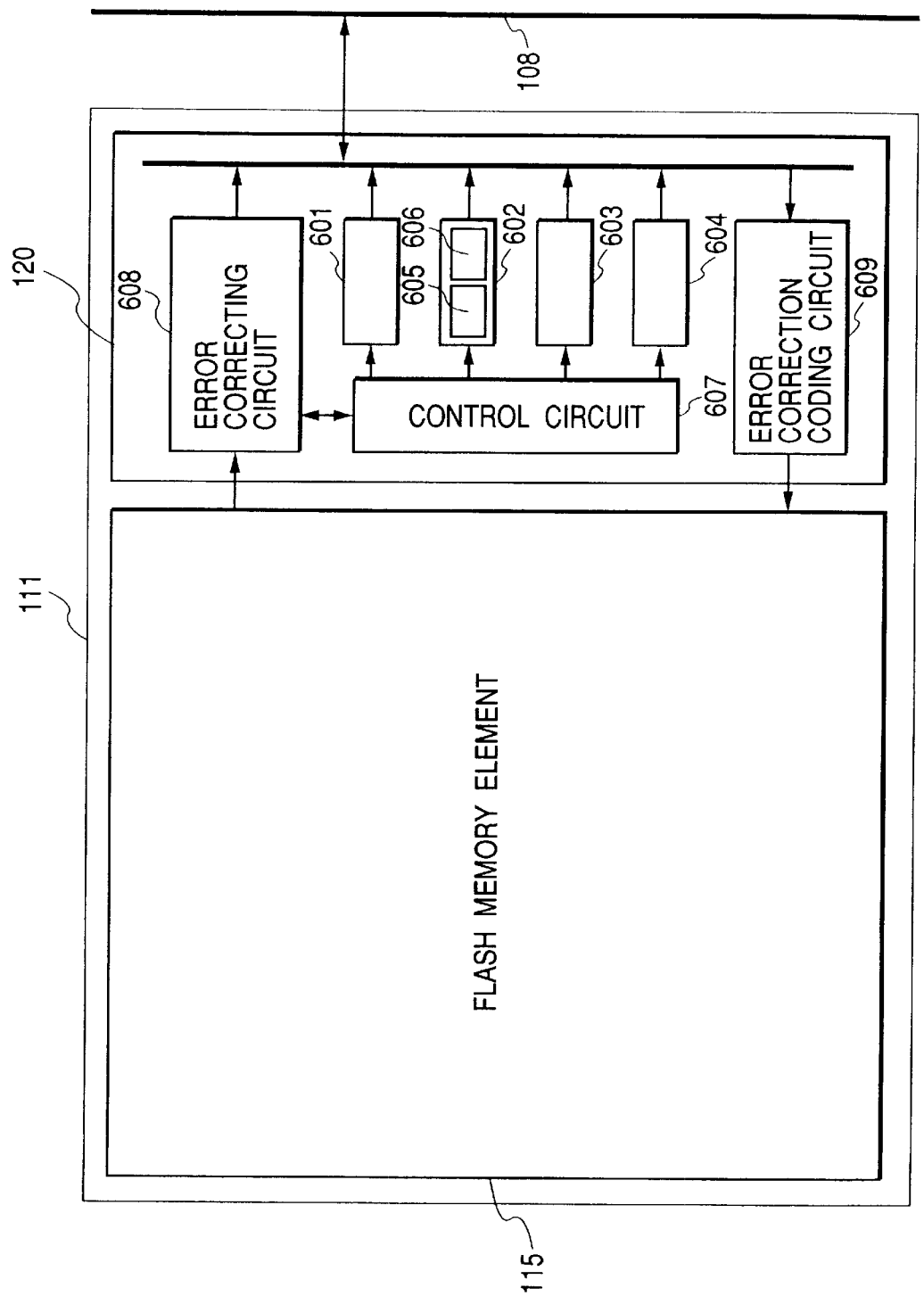
FIG. 2 is a detailed block diagram of the flash memory chip shown in FIG. 1.

FIG. 2 shows the internal arrangement of the on-chip ECC circuit of the flash memory chip shown in FIG. 1. The on-chip ECC circuit 120 includes a residual polynomial register 601, a correction flag register 602 having an correction OK flag 605 and correction failure (FAIL) flag 606, an error locator register 603, an error value register 604, a control circuit 607, an error correcting circuit 608, and an error correction coding circuit 609. The on-chip ECC circuits 121–123 on other flash memory chips 112–114 have the same arrangement.

Figure 3:
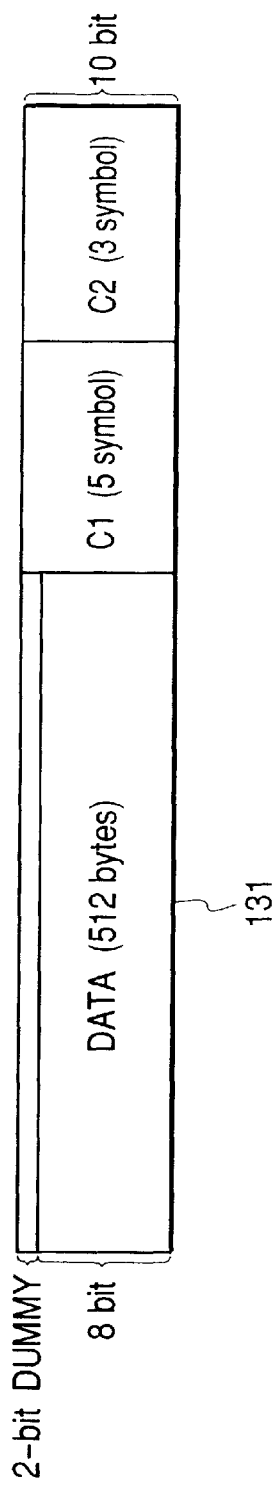
FIG. 3 is a conceptual diagram showing the data format of the flash memory disk shown in FIG. 1.

FIG. 3 explains the error correction code which is generated for each unit size of data. Data 131 has a unit size of 512 bytes by 8 bits.

An error correction code check symbol consists of a 5-symbol outer code check symbol C1 which is put to data by the ECC circuit 107 in the controller 102, and a 3-symbol inner check symbol C2 which is put to the data by the error correction coding circuit 609 in the on-chip ECC circuit 120 on the flash memory chip 111.

An outer code C1' (outer code check symbol C1 plus data) and inner code C2' (inner code check symbol C2 plus outer code check symbol C1 plus data) are BCH codes on a Galois field GF (2$^{10}$) formulated by the following formula (1). In this embodiment, the BCH code can be a binary BCH code or an RS (Reed Solomon) code. The following explanation is based on the use of the RS code. In this embodiment, the outer code C1' and inner code C2' are RS codes in the Galois field GF(2$^{10}$) formulated by the formula (1). One symbol has a unit size which depends on the size of the Galois field, and it is 10 bytes in the present case.

$$g(x)=x^{10}+x^3+1 \quad (1)$$

The outer code C1' has its generation polynomial given by the following formula (2).

$$C1: G1(x)=(x+\alpha^0)(x+\alpha^1)(x+\alpha^2)(x+\alpha^3)(x+\alpha^4) \quad (2)$$

The inner code C2' has its generation polynomial given by the following formula (3).

$$C2: G2(x)=(x+\alpha^5)(x+\alpha^6)(x+\alpha^7) \quad (3)$$

As shown by the formulas (2) and (3), the generation polynomials of the outer code C1' and inner code C2' have continuous indexes of roots. Specifically, the formula (2) has continuous root indexes of 0 through 4, and the formula (3) has continuous root indexes of 5 through 7. And they have continuous root from 0 to 7.

Next, the data write operation will be explained in detail.

Data of the 512 bytes by 8 bits unit size is put in the flash memory disk 101 from an external device over the external bus 109. The controller 102 of the flash memory disk 101 transfers the input data to the ECC circuit 107 through the external bus interface 106.

The ECC circuit 107, which uses the Galois field of GF ($2^{10}$) appends 2 bit's dummy data of "0" to each byte of the 512 bytes by 8 bits data, i.e., d511 (511th byte), d510 (510th byte), d509, ..., d0 (d511 through d0 are expressed by 8 bits of GF ($2^8$), to produce 512 bytes by 10 bits data, i.e., d511', d510', d509', ..., d0', thereby to get a code polynomial of formula (4).

$$d511'x^{511}+d510'x^{510}+\ldots+d1'x+d0' \quad (4)$$

Since the outer code check symbol C1 is of 5-symbol, a polynomial which is the residue resulting from the division by the generation polynomial (2) of a formula (5), which is the code polynomial (4) multiplied by $X^5$, is obtained as shown by formula (6).

$$d511'x^{516}+d510'x^{515}+\ldots+d1'x^6+d0'x^5 \quad (5)$$

$$(d511'x^{516}+d510'x^{515}+\ldots+d1'x^6+d0'x^5)\bmod(x+\alpha^0)(x+\alpha^1)(x+\alpha^2)(x+\alpha^3)(x+\alpha^4)=R14x^4+R13x^3+R12x^2+R11x+R10 \quad (6)$$

Next, from the polynomial (6), R14, R13, R12, R11 and R10 are obtained as the outer code check symbol C1.

The controller 102 next transfers the input data of 512 bytes by 8 bits and the outer code check symbol C1 of 5 symbols by 10 bits to one of the flash memory chips 111,112,113 or 114 in the order of d511, d510, ..., d0, R14, R13, R12, R11 and R10 through the internal bus interface 105. Transfer to the flash memory chip 111 is assumed here.

The error correction coding circuit 609 in the on-chip ECC circuit 120 of the flash memory chip 111, which uses the Galois field of GF($2^{10}$), appends 2 bit's dummy data of "0" to each byte of the 512 bytes by 8 bits data [d511,d510, d509, ..., d0] to produce 512 bytes by 10 bits d [d511', d510',d509', ...,d0'], and adds the outer code check symbol C1 symbols by 10 bits [R14, R13, R12, R11 and R10] thereby to get a codeepolynomial of formula (7).

$$d511'x^{516}+d510'x^{515}+\ldots+d1'x^6+d0'x^5+R14x^4+R13x^3+R12x^2+R11x+R10 \quad (7)$$

Since the inner code check symbol C2 is of 3-symbol, a polynomial which is the residue resulting from the division by the generation polynomial (3) of a formula (8), which is the code polynomial (7) multiplied by $X^3$, is obtained as shown by formula (9).

$$d511'x^{519}+d510'x^{518}+\ldots+d1'x^9+d0'x^8+R14x^7+R13x^6+R12x^5+R11x^4+R10x^3 \quad (8)$$

$$d511'x^{519}+d510'x^{518}+\ldots+d1'x^9+d0'x^8+R14x^7+R13x^6+R12x^5+R11x^4+R10x^3)\bmod(x+\alpha^5)(x+\alpha^6)(x+\alpha^7)=R22x^2+R21x+R20 \quad (9)$$

Next, from the polynomial (9), R22, R21 and R20 are obtained as the inner code check symbol C2.

Subsequently, the error correction coding circuit 609 in the on-chip ECC circuit 120 writes the 512 bytes by 8 bits input data, 5 symbols by 10 bits outer code check symbol C1, and 3 symbols by 10 bits inner code check symbol C2 into the flash memory element 115 in the order of d511, d510, ..., d0, R14, R13, R12, R11, R10, R22, R21 and R20.

Next, the data readout operation will be explained in detail. Data readout from the flash memory chip 111 is assumed here.

The control circuit 607 in the on-chip ECC circuit 120 reads possibly-erroneous data [d511\*,d510\*, ..., d0\*, R14", R13",R12",R11", R10", R22", R21" and R20"] out of the flash memory element 115 into the error correcting circuit 608.

Figure 4:
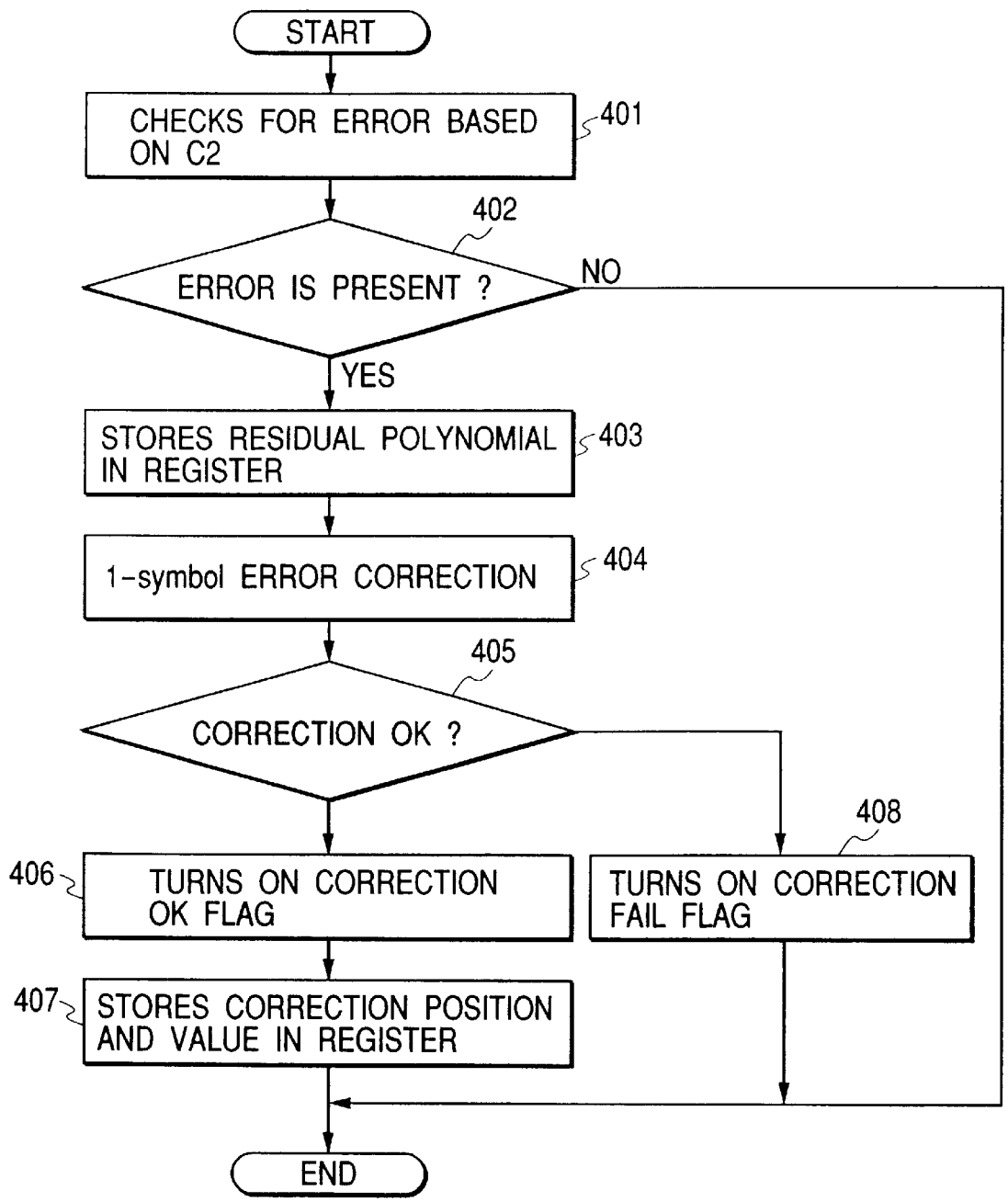
FIG. 4 is a flowchart showing the read operation of the on-chip ECC circuit shown in FIG. 1.

FIG. 4 shows by flowchart the operation of the error correcting circuit 608.

Step 401 gets a code polynomial of the following formula (10) from the readout data [d511\*,d510\*, ..., d0\*,R14", R13",R12",R11",R10",R22",R21" and R20"].

The ECC circuit 107, which uses the Galois field of GF($2^{10}$) appends 2-bit dummy data "0" to each byte of the 512-byte data [d511\*,d510\*, ..., d0\*] (these are numbers expressed by 8 bits of the GF($2^8$) to produce d511" through d0".

$$d511''x^{519}+d510''x^{518}+\ldots+d1''x^9+d0''x^8+R14''x^7+R13''x^6+R12''x^5+R11''x^4+R10''x^3+R22''x^2+R21''x+R20'' \quad (10)$$

Next, the circuit divides the code polynomial (10) by the generation polynomial (3) of the inner code C2', thereby determining the presence or absence of error depending on the presence or absence of a residue.

Step 402 proceeds to step 403 if error is present, or otherwise transfers the data [d511\*,d510\*, ..., d0\*] and outer code check sym C1 [R14",R13",R12",R11",R10"] to the controller 102 and terminates process if error is absent.

Step 403 stores values R32, R31 and R30 for the following residual polynomial (11) into the residual polynomial register 601.

$$R32x^2+R31x+R30 \quad (11)$$

Figure 5:
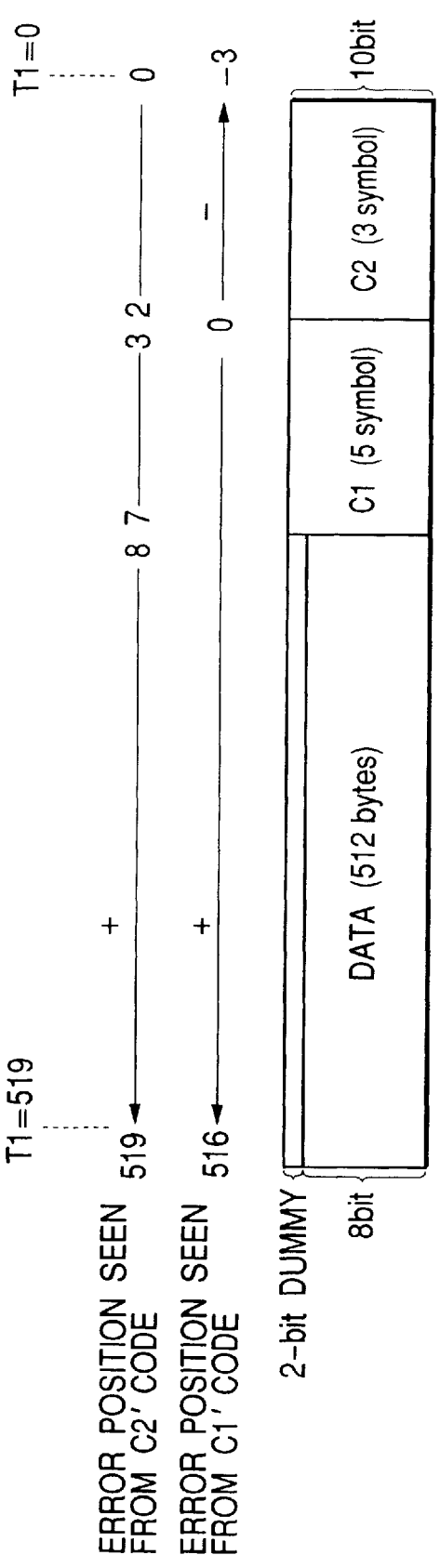
FIG. 5 is a conceptual diagram of data format used to explain the error position seen from the outer code and the error position seen from the inner code.

Step 404 implements the 1-symbol error correction with the error correcting circuit 608. Specifically, the error correcting circuit 608 calculates the error position T1 and error value T2 by using the usual error trap decoding scheme or the like. As shown in FIG. 5, an error position T1=0 indicates the least significant symbol of the inner code check symbol C2, an error position of T1≧8 indicates the presence of error in the 512-byte data, an error position of 7≧T1≧3 indicates the presence of error in the outer code check symbol C1, and an error position of 2≧T1≧0 indicates the presence of error in the inner code check symbol C2.

The calculated error position Ti and error value T2 are used to implement the error correction thereby to get error-corrected data [d511'",d510'", ...,d1'",d0'"] and outer code check symbol C1 [R14" R13'",R12'",R11'",R10'"]. The error correction is based on the exclusive logical sum of the symbol of the code corresponding to the error position T1 and the error value T2, with the resulting value being made the symbol of that position.

Step 405 proceeds to step 406 if error correction has been done, or otherwise (if calculation of error position T1 and error value T2 fails) branches to step 408.

Step 406 turns on the correction OK flag 605 in the correction flag register 602.

Step 407 loads the error position T1 into the error locator register 603 and loads the error value T2 into the error value register 604. The step transfers 8-bit data [d511*', . . . , d0*'], which is the error-corrected data [d511''',d510''', . . . ,d1''', d0'''], with the 2-bit dummy data "0" being removed, and outer code check symbol C1 [R14''', R13''',R12''',R11''' R10'''] to the controller 102 and terminates the process.

Step 408 turns on the correction FAIL flag 606 in the correction flag register 602, transfers the error-incorrected data and outer code check symbol C1 [d511*, d510*, . . . ,d0*,R13'',R12'',R11'',R10''] to controller 102 and terminates the process.

Figure 6:
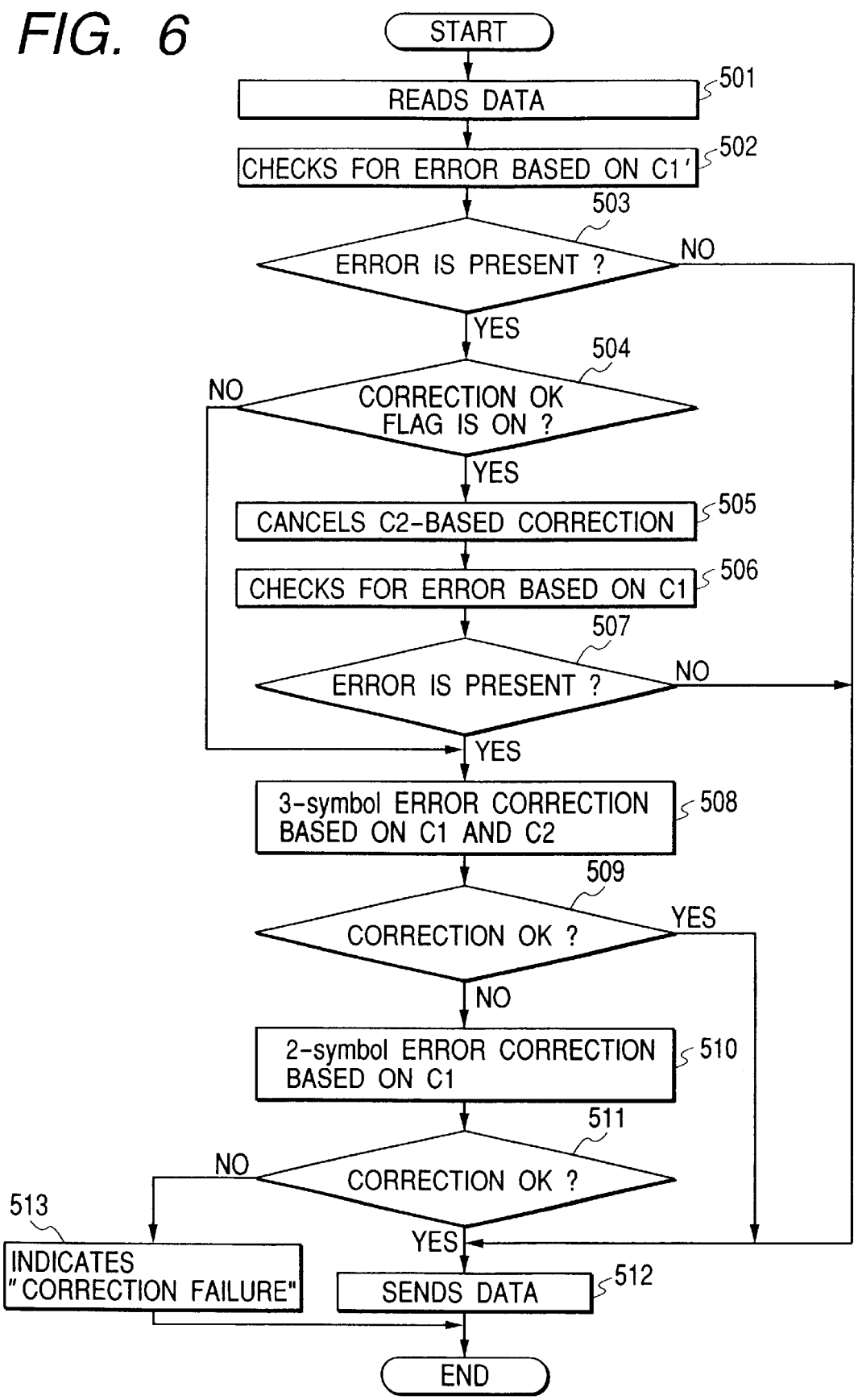
FIG. 6 is a flowchart showing the read operation of the ECC circuit in the controller shown in FIG. 1.

FIG. 6 shows by flowchart the operation of the ECC circuit 107.

Step 501 reads the error-corrected data [d511*', d510*', . . . ,d1*',d0*'] and outer code check symbol C1 [R14''',R13''', R12''',R1 R10'''] out of the flash memory chip 111, or the error-incorrected data [d511*,d510*, . . . ,d1*, d0*,] and outer code check symbol C1 [R14'',R13'', R12'', R11'',R10''].

Step 502 implements the error check based on the outer code C1'. Specifically, it substitutes the root of the generation polynomial (2) of the outer code C1' into x of the code polynomial C(x) which is obtained from the data and outer code check symbol C1 read out of the flash memory chip 111, and determines the presence or absence of error depending on whether at least one of resulting values S0, S1, S2, S3 and S4 is non-zero or all of these values are zero. The values S0, S1, S2, S3 and S4 are called "syndromes".

Step 503 branches to step 512 if error is absent, or otherwise proceeds to step 504.

Step 504 reads the correction OK flag 605 on the flash memory chip 111, and proceeds to step 505 if it is on, i.e., error correction has been done within the flash memory chip 111, or branches to step S508 if it is off, i.e., error correction has not been done within the flash memory chip 111.

Step 505 reads the error position T1 out of the error locator register 603 on the flash memory chip 111, reads the error value T2 out of the error value register 604 on the flash memory chip 111, and takes the exclusive logical sum of the values at the position T1 and the value T2 thereby to restore the data read out of the flash memory element 115.

Step 506 implements another error check for the restored data and outer code check symbol C1 based on the outer code C1', and re-calculates the syndromes S0, S1, S2, S3 and S4. The step determines the presence or absence of error depending on whether at least one of the syndromes S0, S1, S2, S3 and S4 is nonzero or all are zero.

Step 507 branches to step 512 if error is absent, or otherwise proceeds to step 508.

Step 508 reads the residual polynomial (11) out of the residual polynomial register 601 on the flash memory chip 111, and calculates the formula (12) to evaluate the syndromes 85, S6 and S7.

$$S5=R32(\alpha^5)^2+R31(\alpha^5)+R30$$
$$S6=R32(\alpha^6)^2+R31(\alpha^6)+R30$$
$$S7=R32(\alpha^7)^2+R31(\alpha^7)+R30 \qquad (12)$$

Assuming that 3-symbol errors arise in the data or outer code check symbol C1 and the errors have error positions k1, k2 and k3 seen from the outer code C1' (error positions seen from the inner code C2' shift by three bytes) and error values E1, E2 and E3, the syndromes S0–S7 are given by the following formulas (13).

$$S0=C(\alpha^0)+E1(\alpha^0)^{k1}+E2(\alpha^0)^{k2}+E3(\alpha^0)^{k3}=E1(\alpha^0)^{k1}+E2(\alpha^0)^{k2}+E3(\alpha^0)^{k3}$$

$$S1=C(\alpha^1)+E1(\alpha^1)^{k1}+E2(\alpha^1)^{k2}+E3(\alpha^1)^{k3}=E1(\alpha^1)^{k1}+E2(\alpha^1)^{k2}+E3(\alpha^1)^{k3}$$

$$S2=C(\alpha^2)+E1(\alpha^2)^{k1}+E2(\alpha^2)^{k2}+E3(\alpha^2)^{k3}+E1(\alpha^2)^{k1}+E2(\alpha^2)^{k2}+E3(\alpha^2)^{k3}$$

$$S3=C(\alpha^3)+E1(\alpha^3)^{k1}+E2(\alpha^3)^{k2}+E3(\alpha^3)^{k3}+E1(\alpha^3)^{k1}+E2(\alpha^3)^{k2}+E3(\alpha^3)^{k3}$$

$$S4=C(\alpha^4)+E1(\alpha^4)^{k1}+E2(\alpha^4)^{k2}+E3(\alpha^4)^{k3}+E1(\alpha^4)^{k1}+E2(\alpha^4)^{k2}+E3(\alpha^4)^{k3}$$

$$S5=C(\alpha^5)+E1(\alpha^5)^{k1+3}+E2(\alpha^5)^{k2+3}+E3(\alpha^5)^{k3+3}+E1(\alpha^5)^{k1+3}+E2(\alpha^5)^{k2+3}+E3(\alpha^5)^{k3+3}$$

$$S6=C(\alpha^6)+E1(\alpha^6)^{k1+3}+E2(\alpha^6)^{k2+3}+E3(\alpha^6)^{k3+3}+E1(\alpha^6)^{k1+3}+E2(\alpha^6)^{k2+3}+E3(\alpha^6)^{k3+3}$$

$$S7=C(\alpha^7)+E1(\alpha^7)^{k1+3}+E2(\alpha^7)^{k2+3}+E3(\alpha^7)^{k3+3}+E1(\alpha^7)^{k1+3}+E2(\alpha^7)^{k2+3}+E3(\alpha^7)^{k3+3} \qquad (13)$$

Dividing S5, S6 and S7 by $\alpha^{15}$, $\alpha^{18}$ and $\alpha^{21}$, respectively, gives the following formulas (14).

$$S0=E1(\alpha^0)^{k1}+E2(\alpha^0)^{k2}+E3(\alpha^0)^{k3}$$
$$S1=E1(\alpha^1)^{k1}+E2(\alpha^1)^{k2}+E3(\alpha^1)^{k3}$$
$$S2=E1(\alpha^2)^{k1}+E2(\alpha^2)^{k2}+E3(\alpha^2)^{k3}$$
$$S3=E1(\alpha^3)^{k1}+E2(\alpha^3)^{k2}+E3(\alpha^3)^{k3}$$
$$S4=E1(\alpha^4)^{k1}+E2(\alpha^4)^{k2}+E3(\alpha^4)^{k3}$$
$$S5=E1(\alpha^5)^{k1}+E2(\alpha^5)^{k2}+E3(\alpha^5)^{k3}$$
$$S6=E1(\alpha^6)^{k1}+E2(\alpha^6)^{k2}+E3(\alpha^6)^{k3}$$
$$S7=E1(\alpha^7)^{k1}+E2(\alpha^7)^{k2}+E3(\alpha^7)^{k3} \qquad (14)$$

In the formulas (14), E1, E2 and E3 indicate error values, and k1, k2 and k3 indicate error positions. The formulas (14) are identical to the syndromes of the usual 3-symbol correcting RS code, and 3-symbol error correction can be done by a general error correcting algorithm. General error correcting algorithms include the Peterson algorithm, Euclid's algorithm and Chien search.

The eight syndromes S0–S7 of formulas (14) are used to implement the 3-symbol error correction.

Step 509 branches to step 512 if the correction has been done, or otherwise proceeds to step 510.

Step 510 implements the 2-symbol error correction by using five syndromes S0–S4 obtained in the previous step 506.

Step 511 proceeds to step 512 if the correction has been done, or otherwise branches to step 513.

Step 512 sends the data to the external device through the external bus interface 106 and external bus 109, and terminates the operation.

Step 513 indicates the occurrence of uncorrectable error to the external device through the external bus interface 106 and external bus 109, and terminates the operation.

In the foregoing first embodiment, it is designed that the first error correction code of the ECC circuit 107 in the controller 102 and the second error correction codes of the ECC circuits 120–123 on the flash memory chips 111–114 are BCH codes (particularly, RS codes) using the Galois field, and the generation polynomials of these error correction codes have continuous roots. The ECC circuit 107 implements the first error correction coding by using the first error correction code, and the flash memory chips 111–114 implement the second error correction coding by using the second error correction codes.

The flash memory chips 111–114 indicate to the controller 102 the correction information indicating that the second error correction has been done by use of the second error correction codes, information of the intermediate error correcting computation, and information of the error position and error value. The controller 102 uses the information provided by the flash memory chips 111–114 to detect error based on the first error correction code. If error is detected, the controller 102 cancels the result of second error correction made by the flash memory chips 111–114 based on the correction information and information of the error position and value provided by the flash memory chips 111–114.

The controller 102 calculates the error position and error value by using the syndromes of second error correction codes retrieved from the information of computation and the syndrome of first error correction code calculated by the controller 102. Error correction is carried out for the restored data based on the calculated error position and value.

As described above, the flash memory disk 101 of the first embodiment has the ability of 3-symbol error correction derived from the 1-symbol error correcting ability of the ECC circuits 120–123 on the flash memory chips 111–114 and the 2-symbol error correcting ability of the ECC circuit 107 of the controller 102. In consequence, it becomes possible to reduce the scale of the ECC circuit 107 of the controller 102 to ⅔ as compared with the conventional design in which case the ECC circuit of controller is designed to have a 3-symbol error correcting ability without using ECC circuits on the flash memory chips. It should be noted that the coding circuit and syndrome generator of the ECC circuit 107 become larger in scale in proportion to the degree of ability.

Although in the above explanation, the on-chip ECC circuits 120–123 on the flash memory chips 111–114 indicate the residual polynomial, which is the residue resulting from the division of the code polynomial of the inner code C2' by the generation polynomial, to the controller 102 via the residual polynomial register 601, an alternative scheme is to have a syndrome register and indicate the syndromes S5, S6 and S7 which are obtained by substituting the roots of generation polynomials into the code polynomial of the inner code C2'.

Next, the second embodiment of this invention will be explained. In contrast to the first embodiment, this embodiment eliminates the need, on the part of the controller 102, of the restoration of incorrected data from the data corrected by the flash memory chip 111.

Figure 7:
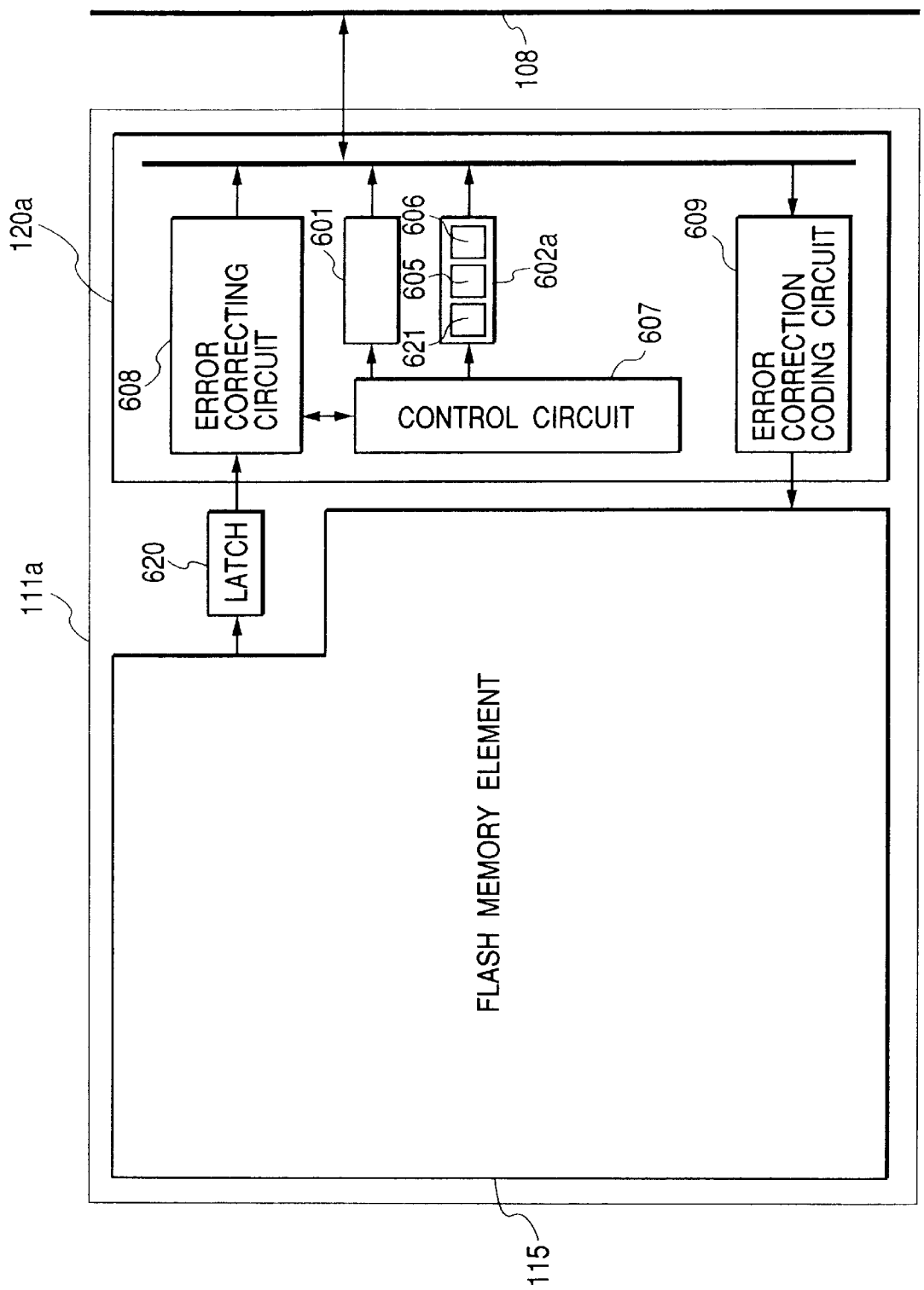
FIG. 7 is a detailed block diagram showing a second embodiment of the flash memory chip based on this invention.

FIG. 7 shows by block diagram the internal arrangement of the flash memory chip based on this embodiment. This flash memory chip 111*a* is derived from the flash memory chip 111 shown in FIG. 2, with the error position register 603 and error value register 604 being removed and with a latch circuit 620 being added between the flash memory element 115 and the on-chip ECC circuit 120*a* and an error flag 621 being added in the correction flag register 602*a*.

The latch circuit 620 reads and holds possibly-erroneous data [d511*,d510*, ... ,d0*,R14",R13",R12",R11",R10", R22",R21",R20"] an of the flash memory element 115, and loads the data into the error correcting circuit 608 and also puts the data in the controller 102.

The error flag 621 is set to indicate "present" when the error correcting circuit 608 detects an error, or otherwise it is reset to indicate "absent". Remaining flash memory chips 112*a*–114*a* which correspond to the flash memory chips 112–114 of FIG. 2 have the same arrangement.

Figure 8:
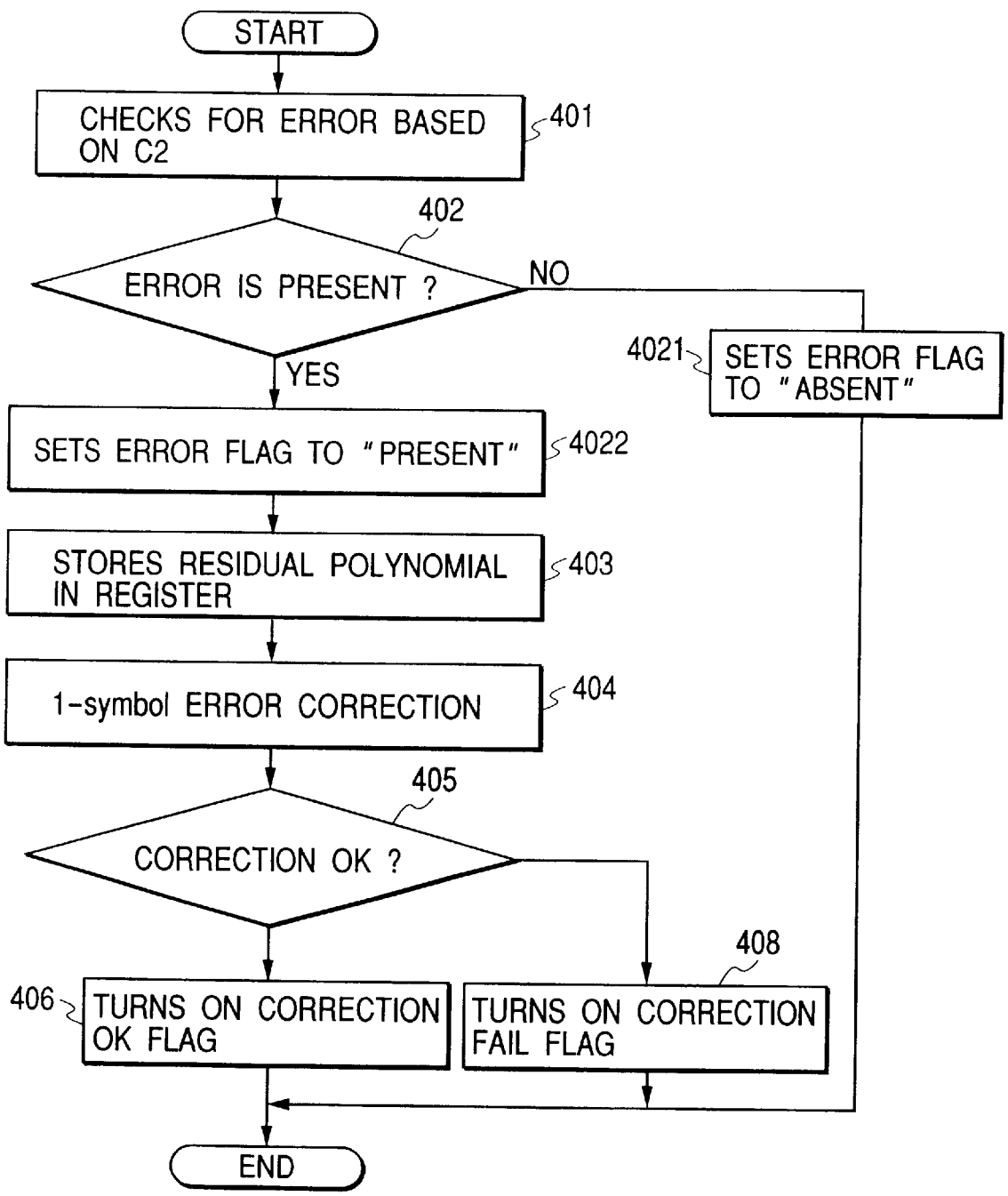
FIG. 8 is a flowchart showing the read operation of the on-chip ECC circuit shown in FIG. 7.

FIG. 8 shows by flowchart the operation of the error correcting circuit 608.

Step 401 gets a code polynomial of the formula (10) from the readout possibly-erroneous data [d511*, d510*, ... ,d0*,R14", R13",R12", R11",R10",R22", R21" and R20"] in the same manner as the first embodiment. The step divides the code polynomial (10) by the generation polynomial (3) of the inner code C2', thereby determining the presence or absence of error depending on the presence or absence of a residue.

Step 402 branches to step 4021 if error is absent, or otherwise proceeds to step 4022. Step 4021 resets the error flag 621 to indicate "absent", and terminates the process. Step 4022 sets the error flag 621 to indicate "present".

Step 403 stores the residual polynomial (11), which is the residue mentioned above, in the residual polynomial register 601.

Step 404 implements the 1-symbol error correction with the error correcting circuit 608 to get error-corrected data [d511''',d510''', ... , d1''',d0'''] and outer code check symbol C1 [R14''',R13''',R12''',R11'''R10'''].

Step 405 proceeds to step 406 if error correction has been done, or otherwise (if calculation of error position T1 and error value T2 fails) branches to step 408.

Step 406 transfers data [d511*', ... ,d0*'], which is the error-corrected data [d511''',d510''', ... ,d1''',d0'''], with the 2-bit dummy being removed, and outer code check symbol C1 [R14''',R13''',R12''',R11''',R10 to the controller 102, turns on the correction OK flag 605 in the correction flag register 602, and terminates the process.

Step 408 turns on the correction FAIL flag 606 in the correction flag register 602, and terminates the process.

Figure 9:
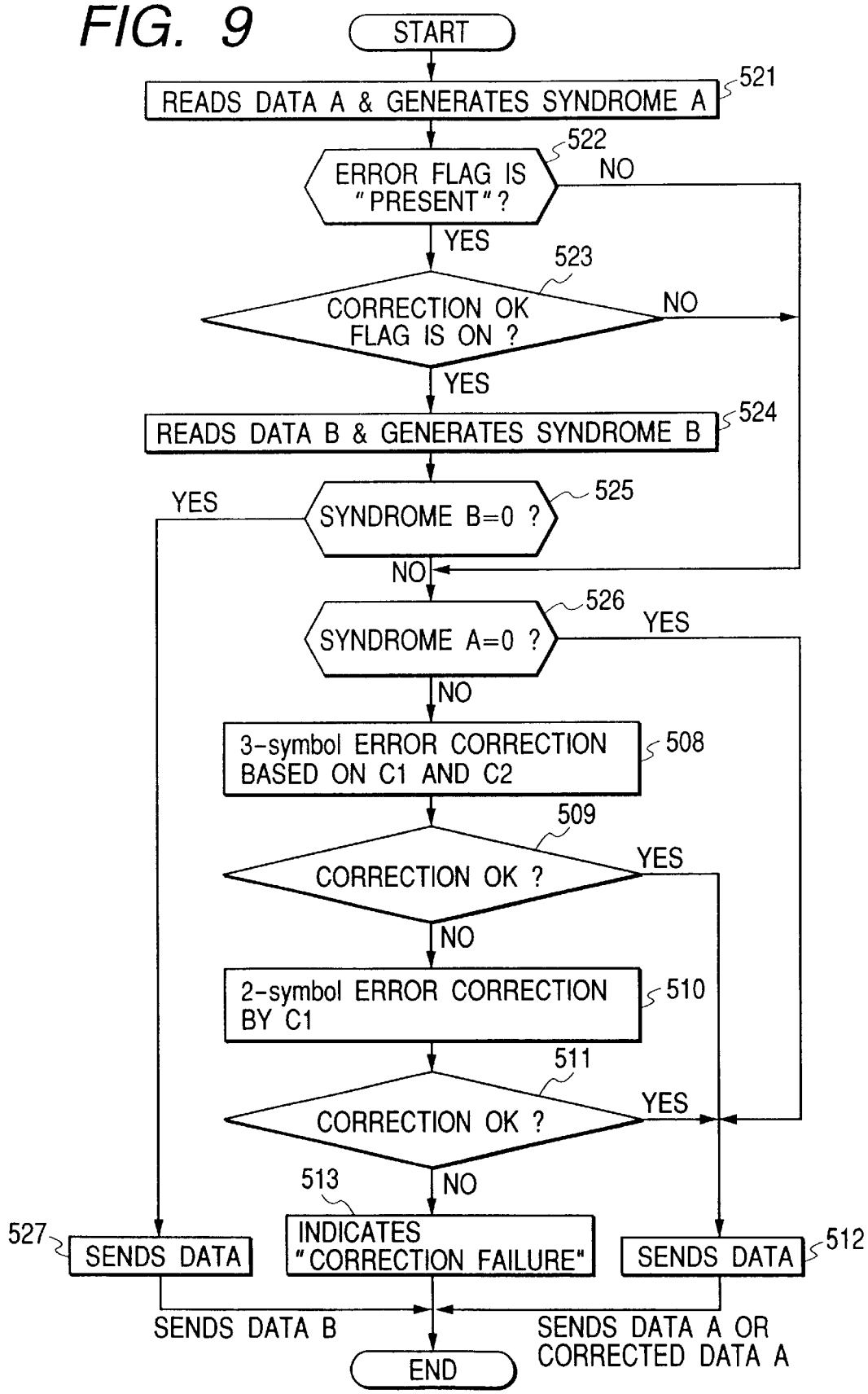
FIG. 9 is a flowchart showing the read operation of the ECC circuit in the controller shown in FIG. 7.

FIG. 9 shows by flowchart the operation of the ECC circuit 107 in the controller 102.

Step 521 reads the error-incorrected data A [d511*, d510*, ... ,d0*,] and outer code check symbol C1A [R14",R13",R12",R11",R10"] the flash memory chip 111, and calculates syndrome A for each byte with the ECC circuit 107. Specifically, it substitutes the root of the generation polynomial (2) of the outer code C1' into x of the code polynomial C(x) which is obtained from the data A and outer code check symbol C1A, with 2-bit dummy "0" being added to the data, thereby to get syndrome A [S0, S1, S2, S3 and S4].

Step 522 checks the error flag 621 in the on-chip ECC circuit 120*a*, and proceeds to step 523 if it indicates "present", or branches to step 526 if it indicates "absent".

Step 523 checks the correction OK flag 605 on the flash memory chip 111, and proceeds to step 524 if it is on, i.e., error correction has been done within the flash memory chip 111, or branches to step 526 if it is off, i.e., error correction has not been done within the flash memory chip 111.

Step 524 reads the error-corrected data B [d511*', d510*', ... ,d1*',d0*'] and outer code check symbol C1B [R14''',R13''', R12''', R11''', R10'''] out of the flash memory chip 111*a*, and generates syndrome B. Specifically, it substitutes the root of the generation polynomial (2) of the outer code C1' into x of the code polynomial C(x) which is the data B, with the 2-bit dummy being added thereto, and the outer code check symbol C1B thereby to get syndrome B [S0, S1, S2, S3 and S4].

Step 525 determines the absence of error and branches to step 527 if the syndrome B is "0" (if S0, S1, S2, S3 and S4 are all "0"), or otherwise if B is not "0" (if any of S0, S1, S2, S3 and S4 is non-zero) determines the presence of error and branches to step 526.

Step 526 determines the absence of error and branches to step 512 if the syndrome A is "0" (if S0, S1, S2, S3 and S4 are all "0"), or otherwise if A is not "0" (if any of S0, S1, S2, S3 and S4 is non-zero) determines the presence of error and proceeds to step 508.

Step 508 implements the 3-syndrome error correction for the data A by using the eight syndromes S0–S7 in the same manner as step 508 of FIG. 6.

Step 509 branches to step 512 if the correction has been done, or otherwise proceeds to step 510.

Step 510 implements the 2-symbol error correction for the data A by using the syndromes S0–S4 obtained in the preceding step 521.

Step 511 branches to step 512 if the correction has been done, or otherwise proceeds to step 513.

Step 512 sends the data A or corrected data A to the external device through the external bus interface 106 and external bus 109, and terminates the operation.

Step 513 indicates the occurrence of uncorrectable error to the external device through the external bus interface 106 and external bus 109, and terminates the operation.

Step 527 sends the data B to the external device through the external bus interface 106 and external bus 109, and terminates the operation.

As described above, the flash memory disk 101a of the second embodiment achieves the same effectiveness as the flash memory disk 101 of the preceding first embodiment and, in addition, it does not need to restore incorrected data on the part of the controller 102.

Next, the flash memory card based on this invention will be explained.

Figure 10:
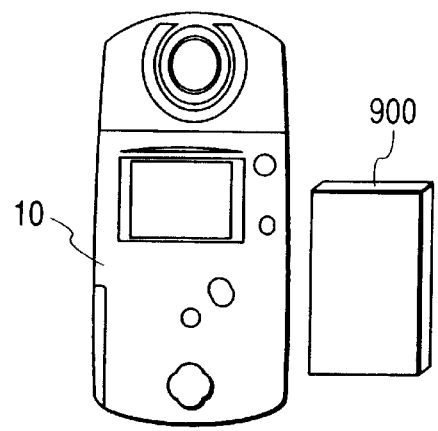
FIG. 10 is a front view of an embodiment of the MPEG camera which employs the flash memory card based on this invention.

FIG. 10 is shows the front view of an embodiment of the MPEG camera which uses a flash memory card. Reference numeral 10 denotes the MPEG camera, and 900 is the flash memory card.

Figure 11:
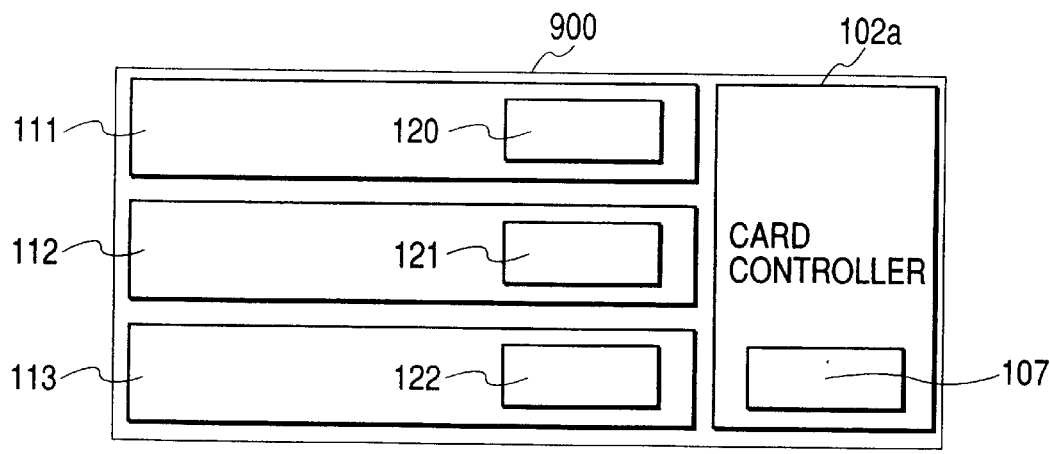
FIG. 11 is a block diagram showing an embodiment of the flash memory card based on this invention.

FIG. 11 shows an embodiment of the arrangement of the flash memory card. The flash memory card 900 consists of the flash memory chips 111–113 of the first embodiment or the flash memory chips 111a–113a of the second embodiment, and a card controller 102a which is similar to the controller 102 of the first and second embodiments. The flash memory card 900 has connector terminals (not shown) for connection with the MPEG camera 10 for data transaction.

Figure 12:
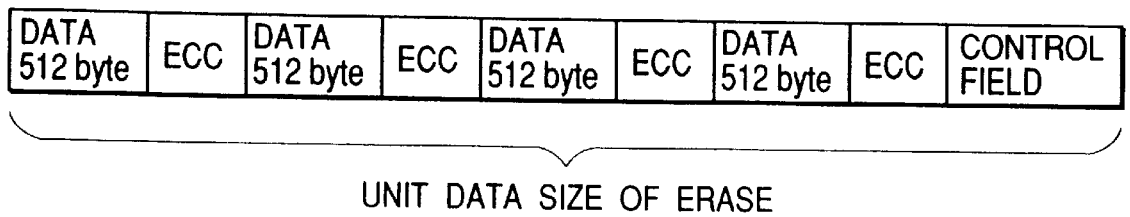
FIG. 12 is a conceptual diagram showing the data format of the flash memory card shown in FIG. 11.

FIG. 12 shows an embodiment of the data format of the flash memory card. A record of 2048 bytes as shown is the unit data size of erasure by the card controller 102a. An error correction code ECC is appended to every 512 byte of data which is the unit data size of processing by the MPEG camera 10.

This flash memory card 900, which processes the error correction code ECC for 512-byte data which is equal in size to data processing, does not need extra data readout at the read/write operation, and therefore can simplify the process and operate fast. Based on the unit data size of erasure of 2048 bytes which is more than twice the unit data size of processing, it can reduce the circuit scale and increase the per-byte processing speed.

Figure 13A:
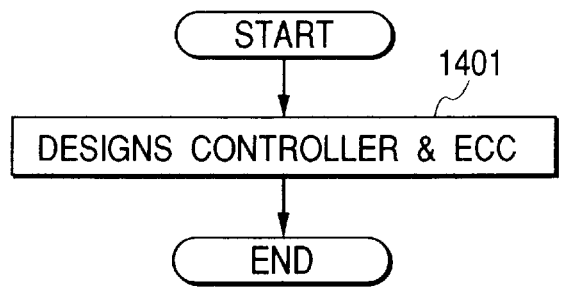
FIG. 13A is a flowchart showing the design procedure of the flash-memory card shown in FIG. 11.
Figure 13B:
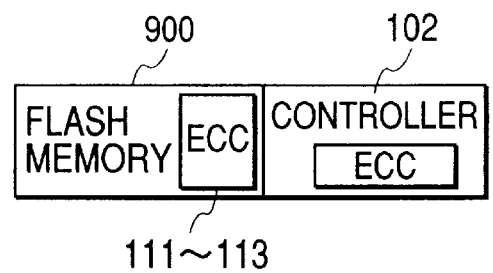
FIG. 13B is a block diagram of the flash memory card.

FIG. 13A shows by flowchart the design procedure for a flash memory card 900, such as an MMC (Multi-Media Card) or "memory stick", formed on a semiconductor chip, and FIG. 13B shows the arrangement of the flash memory card 900. Since the on-chip ECC circuits 120–123 of the flash memory chips 111–113 can be utilized intact, it only needs a design step 1401 for the controller 120 and error correcting function block, resulting in a reduced design work and manufacturing cost.

Figure 14:
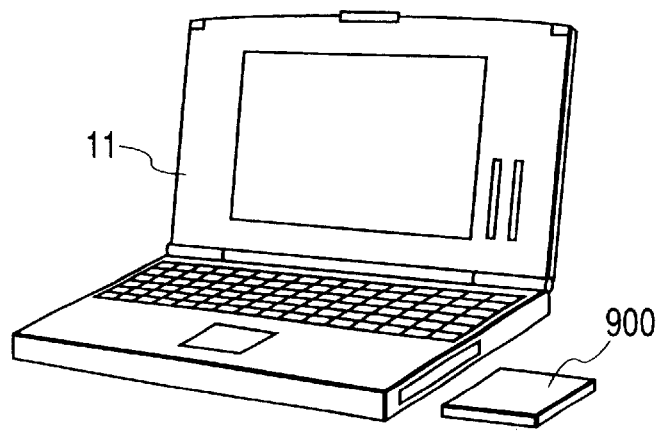
FIG. 14 is a perspective view of an embodiment of the portable terminal device which employs the flash memory card shown in FIG. 11.

The flash memory card 900 can also be used for a portable terminal unit 11 as shown in FIG. 14.

Next, another embodiment of the flash memory card based on this invention will be explained in connection with FIGS. 15, 16 and 17.

Figure 15:
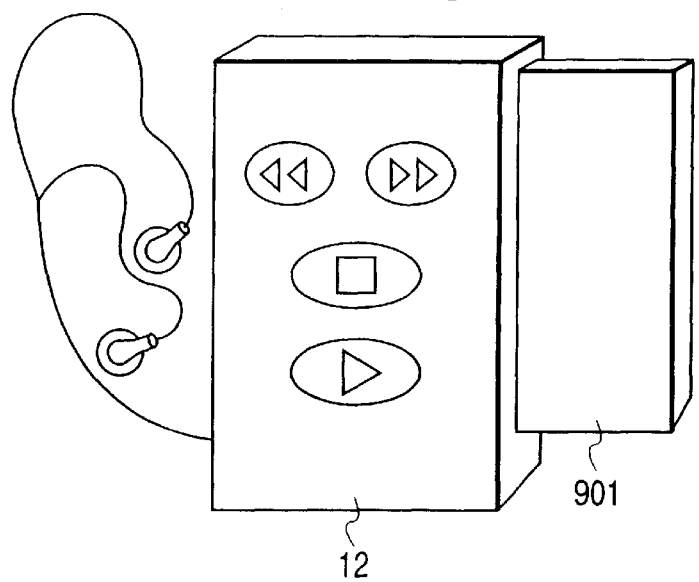
FIG. 15 is a perspective view of an embodiment of the portable recording/reproduction device which employs the flash memory card based on another embodiment.
Figure 16:
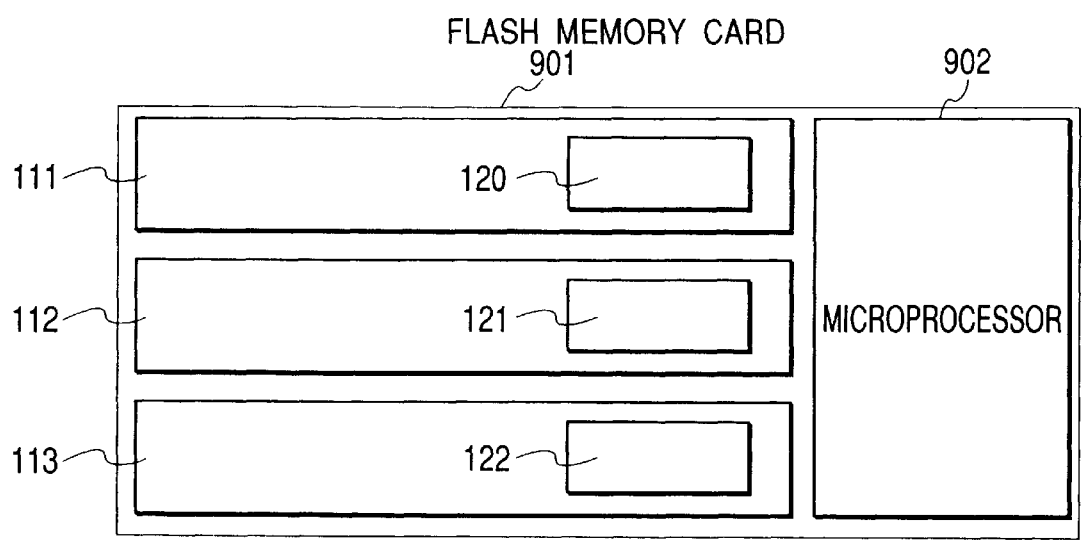
FIG. 16 is a block diagram showing another embodiment of the flash memory card based on this invention.

FIG. 15 shows the external view of the portable recording/reproduction unit using a flash memory card of this embodiment, and FIG. 16 shows by block diagram another embodiment of the flash memory card based on this invention.

The flash memory card 901 can be used suitably for a music or voice portable recording/reproduction unit 12 as shown in FIG. 15. The flash memory card 901 shown in FIG. 16 is made up of flash memory chips 111–113 of the first embodiment and a microprocessor 902. The flash memory card 901 has connector terminals (not shown) for connection with the music or voice portable recording/reproduction unit 12 for data transaction.

The error correcting function needs a fast computation, and it is too tight for the microprocessor 902 to deal with without spoiling the system throughput. On this account, the microprocessor 902 has an interface function for data transaction with the outside, but does not have an error correcting function.

Figure 17:
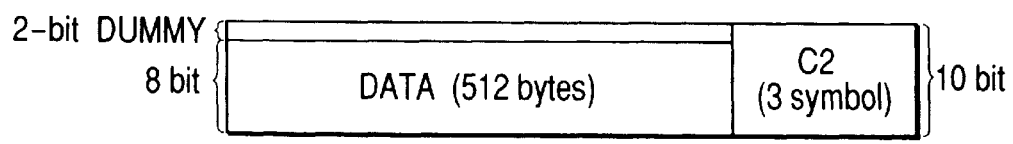
FIG. 17 is a conceptual diagram showing the data format of the flash memory card shown in FIG. 16.
Figure 18A:
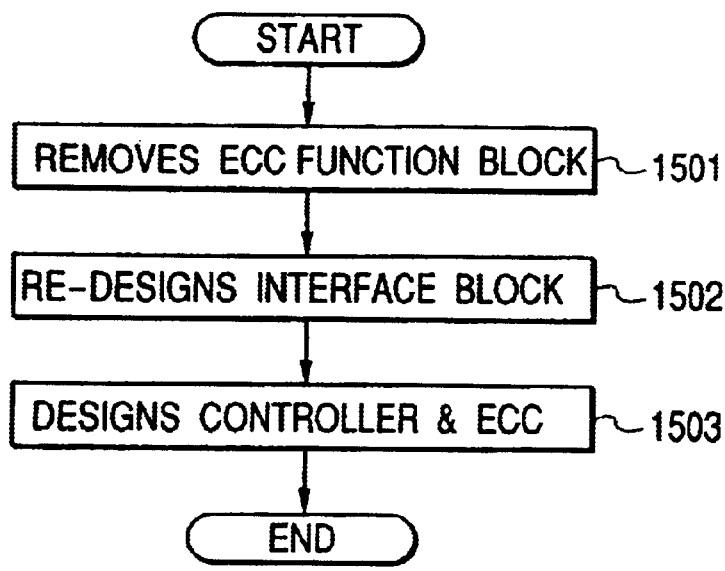
FIG. 18A is a flowchart showing the design procedure of the conventional flash memory card.
Figure 18B:
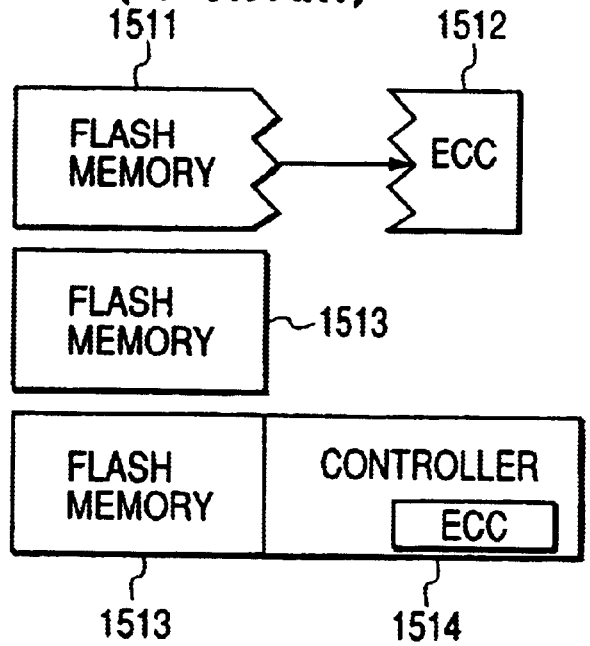
FIG. 18B is a block diagram of the conventional flash memory card.

Accordingly, in the data format of the flash memory card 901 as shown in FIG. 17, only the inner code C2 generated by the ECC circuits 120–123 on the flash memory chips 111–113 are appended as the error correction code ECC to every 512 byte of data which is the unit data size of processing of the music or voice portable recording/reproduction unit 12.

This flash memory card 901, which uses the inexpensive microprocessor 902 in place of the expensive controller, can be manufactured at a very low cost. Based on the process of error correction code ECC in the 512-byte size which is the unit data size of processing of the music or voice portable recording/reproduction unit 12, it does not need extra data readout at the read/write operation, and therefore can simplify the process and operate fast. By having a unit data size of erasure which is twice or more than the unit data size of processing, it can reduce the circuit scale and speeding up the per-byte processing speed.

Although this flash memory card 901 is inferior in terms of the reliability to the flash memory card 900, this matter is not crucial when contrasting with its low cost.

The recording/reproduction device and semiconductor memory based on this invention achieve the following effectiveness.

(a) The recording/reproduction devices of the first and second embodiments can use both error correcting abilities of the semiconductor memory and controller section, thereby enhancing the reliability, and even if the semiconductor memory has made a faulty correction, the device is not adversely affected by it. Specifically, for example, when the semiconductor memory has a 1-symbol error correcting ability and the controller section has a 2-symbol error correcting ability, the recording/reproduction device acquires a 3-symbol error correcting ability as the whole.

Generally, the coding circuit and syndrome generating circuit of the error correcting circuit become larger in scale in proportion to the degree of error correcting ability. Whereas, according to this invention, it is possible to reduce the scale of the error correcting circuit of the controller section to ⅔ as compared with the conventional design.

(b) The memory card of the third embodiment processes the error correction code in the unit data size of processing of the device in which the semiconductor memory is used, and consequently the process can be simplified. By selecting the unit data size of erasure larger than the unit data size of processing, the circuit scale can be reduced and the per-byte processing speed can be increased. The error correcting ability of the semiconductor memory can be utilized intact, and it becomes easy to design a recording/reproduction device which is based on the semiconductor memory having the error correcting function.

(c) The recording/reproduction device of the fourth embodiment can be arranged to include solely semiconductor memory chips and a microprocessor, and consequently it can be manufactured at a low cost.

The invention may be embodied in other specific forms without departing from the spirit or essential characteristics thereof. The present embodiment is therefore to be considered in all respects as illustrative and not restrictive, the scope of the invention being indicated by the appended rather than by the foregoing description and all changes which come within the meaning and range of equivalency of the claims are therefore intended to be embraced therein.

What is claimed is:

1. A recording/reproduction device comprising:
   a controller section having a first error correction code generator which generates a first error correction code for data put in from outside, and a first error corrector which implements and error detection and correction by using the first error correction code; and
   a semiconductor memory section having a second error correction code generator which generates a second error correction code for the first error correction code provided by said controller section, a memory which stores the data from said controller section, a first error correction code check symbol which is the first error correction code, with the data being excluded therefrom, and a second error correction code check symbol which is the second error correction code, with the data and first error correction code check symbol being excluded therefrom, and a second error corrector which implements and error detection and correction by using the data and first and second error correction code check symbols read out of said memory,
   wherein the second error correction code is BCH code in a shame Galois field as the first error correction code has a continuous root, and said controller section implements an error correction by using and error correction result provided by said second error corrector.

2. A recording/reproduction device comprising:
   a controller section having an external interface which transacts data with outside, a first error correction code generator which generates a first error correction code for input data, and a first error corrector which implements an error detection and correction by using the first error correction code; and
   a semiconductor memory section having a second error correction code generator which generates a second error correction code, which is a BCH code in a same Galois field as the first error correction code and has a continuous root, for the first error correction code provided by said controller section, a memory which stores the data from said controller section, a first error correction code check symbol which is the first error correction code, with the data being excluded therefrom, and a second error correction code check symbol which is the second error correction code, with the data and first error correction code check symbol being excluded therefrom, and a second error corrector which implements an error detection and correction by using the data and first and second error correction code check symbols read out of said memory,
   wherein said controller section implements an error correction by using and error correction result provided by said semiconductor memory section.

3. A recording/reproduction device according to claim 2 wherein said correction result includes information on whether or not said second error corrector has corrected the data and first error correction code check symbol, information on the intermediate error correcting computation, information of detected error positions and error values, and the data and first error correction code check symbol read out of said memory.

4. A recoding/reproduction device according to claim 2 wherein said correction result includes information on whether or not said second error corrector has corrected the data and first error correction code check symbol, and the data and first error correction code check symbol corrected by said second error corrector.

5. A recording/reproduction device comprising:
   a controller section having an external interface which transacts data with outside, a first error correction code generator which generates a first error correction code for input data, and a first error corrector which implements an error detection and correction by using the first error correction code; and
   a semiconductor memory section having a second error correction code generator which generates a second error correction code, which is a BCH code in a same Galois field as the first error correction code and has a continuous root, for the first error correction code provided by said controller section, a memory which stores the data from said controller section, a first error code check system symbol which is the first error correction code, with the data being excluded therefrom, and a second error correction code check symbol which is the second error correction code, with the data and first error correction code check symbol being excluded therefrom, a second error correction which implements an error detection and correction by using the data and first and second error correction code check symbols read out of said memory, a correction information indicator which indicates information on whether or not said error correction has corrected the data and first error correction code check symbol, information of an intermediate error correcting computation and information of detected error positions and error values to said first error corrector, and a data sender which sends the data and first error correction code check symbol read out of said memory or data corrected by said error corrector and the first error correction code check symbol to said first error corrector,
   wherein said first error corrector detects an error by using the data and first error correction code check symbol provided by said data sender and, if said second error corrector has corrected the data, restores error-incorrected data by using the positions and error values and, if error is detected in the restored data and the first error correction code check symbol, implements an error correction for restored data by using the first error correction code check symbol and information of computation, and implements the error detection by using the first error correction code, or, if said error corrector has failed in data correction, attempts error correction for the error-incorrected data by using the first error correction code check symbol and information of computation and, if the error correction fails, attempts error correction for the restored data or the error-incorrected data by using the first error correction code check symbol.

6. A recording/reproduction device according to claim 5, wherein said BCH code is an RS code.

7. A recording/reproduction device according to claim 5, wherein said information of computation comprises a residual polynomial which is a residue resulting from a division of a code polynomial of the second error correction code by a generation polynomial, or syndromes resulting from a substitution of roots of the generation polynomial in the code polynomial of the second error correction code.

8. A recording/reproduction device comprising:
   a controller section having an external interface which transacts data with outside, a first error correction code generator which generates a first error correction code for input data, and a first error corrector which implements an error detection and correction by using the first error correction code; and
   a semiconductor memory section having a second error correction code generator which generates a second error correction code, which is a BCH code in a same Galois field as the first error correction code and has a continuous root, for the first error correction code provided by said controller section, a memory which stores data from said controller section, a first error correction code check symbol which is the first error correction code, with the data being excluded therefrom, and a second error correction code check symbol which is the second error correction code, with the data and first error correction code check symbol being excluded therefrom, and a second error corrector which implements the error detection and correction by using the data and first and second error correction code check symbols read out of said memory,
   wherein said controller section, upon detecting an error, implements an error correction based on the first error correction code check symbol and information of computation provided by said semiconductor memory section and, upon falling in error correction, implements an error correction for the data read out of said memory by using the first error correction code check symbol.

9. A recording/reproduction device according to claim 8, wherein said information provided for said controller section by said semiconductor memory section includes information on whether or not an error has been detected and information on whether or not error correction has be done.

10. A recoding/reproduction device comprising:
    a controller section having an external interface which transacts data with outside, a first error correction code generator which generates a first error correction code for input data, and a first which implements an error detection and correction by using the first correction code; and
    a semiconductor memory section having a second error correction code generator which generates a second error correction code, which is a BCH in a same Galois field as the first correction code and has a continuous root, for the first error correction code provided by said controller section, a memory which stores the data, a first error correction code check symbol which is the first error correction code, with the data being excluded therefrom, and a second error correction code check symbol which is the second error correction code, with the data and first error correction code check symbol being excluded therefrom, a second error corrector which implements the error detection and correction by using the data and first and second error correction code check symbols read out of said memory, an information indicator which indicates information on whether or not said second error corrector has detected an error, information on whether or not the data and first error correction code check symbol have been corrected and information of the intermediate error correcting computation to said first error corrector, and a data sender which sends the data and first error correction code check symbol read out of said memory and the data and first error correction code check symbol which are corrected by said second error corrector to said first error corrector,
    wherein said first error corrector, in case said second error corrector has not detected an error but detected an error in the data read out of said memory by using the first error correction code check symbol, or in case said second error corrector has failed in data correction but detected an error in the data read out of said memory by using the first error correction code check symbol, or in case said second error corrector has detected an error by using the first error correction code check symbol in the data which has been corrected by said second error corrector, attempts an error correction for the data read out of said memory by using the first error correction code check symbol and information of computation and, if error correction fails, attempts error correction for the data read out of said memory by using the first error correction code check symbol.

11. A recording/reproduction device according to claim 10, wherein said BCH code is an RS code.

12. A recoding/reproduction device according to claim 10, wherein said information of computation comprises a residual polynomial which is the residue resulting from a division of a code polynomial of the second error correction code by a generation polynomial, or syndromes resulting from a substitution of roots of the generation polynomial into a code polynomial of the second error correction code.

13. A semiconductor memory comprising:
    a second error correction code generator which generates a second error correction code, which is a BCH code in a same Galois field as a first error correction code and has a continuous root, for a first error correction code provided by a first error corrector, a memory which stores data and first and second error correction code check symbols, a second error corrector which implements an error detection and correction by using the data and first and second error correction code check symbols read out of said memory, a correction information indicator which indicates information on whether or not said second error corrector has corrected the data and first error correction code check symbol, information of intermediate error correcting computation and information of detected error positions and error values to said first error corrector, and a data sender which sends the data and first error correction code check symbol read out of said memory of the data corrected by said second error corrector and first error correction code check symbol to said first error corrector.

14. A semiconductor memory according to claim 13, wherein said BCH code is an RS code.

15. A semiconductor memory according to claim 13, wherein said information of computation comprises a residual polynomial which is a residue resulting from a division of a code polynomial of the second error correction code by a generation polynomial, or syndromes resulting from substitution of roots of the generation polynomial into a code polynomial of the second error correction code.

16. A semiconductor memory comprising:
a second error correction code generator which generates a second error correction code, which is a BCH code in a same Galois field as a first error correction code and has a continuous root, for a first error correction code provided by a first error corrector, a memory which stores the data and first and second error correction code check symbols, a second error corrector which implements an error detection and correction by using the data and first and second error correction code check symbols read out of said memory, an information indicator which indicates information on whether or not said second error corrector has detected and error, information on whether or not the data and first error correction code check symbol have been corrected and information of intermediate error correcting computation to said first error corrector, and a data sender which sends the data and first error correction code check symbol read out of said memory and the data and the first error correction code check symbol corrected by the second error corrector to said first error corrector.

17. A semiconductor memory according to claim 16, wherein said BCH code is an RS code.

18. A semiconductor memory according to claim 16, wherein said information of computation comprises a residual polynomial which is a residue resulting from a division of code polynomial of the second error correction code by a generation polynomial, or syndromes resulting from a substitution of roots of the generation polynomial into a code polynomial of the second error correction code.

19. A semiconductor memory according to claim 16, wherein said semiconductor memory implements error correction-coding in a unit data size of processing of data to be read out of or written into said memory, and implements a data erasure in a unit data size of erasure which is twice or more than said unit data size of processing.

20. A memory card comprising:
a card controller section having a first error correction code generator generates a first error correction code for data put in from outside, and a first error corrector which implements an error detection and correction by using the first error correction code;
a semiconductor memory section having a second error correction code generator which generates a second error correction code for the data and first error correction code provided by said card controller section, a memory which stores the data from the card controller section, a first error correction code check symbol which is the first error correction code, with the data being excluded therefrom, and a second error correction code check symbol which is the second error correction code, with the data and first error correction code check symbol being excluded therefrom, and a second error corrector which implements an error detection and correction by using the data and first and second error correction code check symbols read out of said memory; and
a connecting section which transacts data with an external device,
wherein the second error correction is a BCH code in a same Galois field as the first error correction code and has a continuous root, and said card controller section implements an error correction by using and error correction result provided by said second error corrector.

21. A memory card comprising:
a card controller section having an external interface which transacts data with outside, a first error corrector code generator which a first error correction code for input data, and a first error corrector which implements an error detection and correction by using the first error correction code;
a semiconductor memory section having a second error correction code generator which generates a second error correction code, which is a BCH code in a same Galois field as the first error correction code and has a continuous root, for the data and first error correction code provided by said card controller section, a memory which stores the data from said card controller section, a first error correction code check symbol which is the first error correction code, with the data being excluded therefrom, and a second error correction code check symbol which is the second error correction code, with the data and first error correction code check symbol being excluded therefrom, and a second error corrector which implements error detection and correction by using the data and first and second error correction code check symbols read out of said memory; and
a connecting section which transacts data with an external device,
wherein said card controller section, upon detecting an error, implements an error correction based on the first error correction code check symbol and information of computation provided by said semiconductor memory section and, upon failing in error correction, implements and error correction for the data read out of said memory by using the first error correction code check symbol.

22. A semiconductor memory comprising:
a memory unit for storing data, an error corrector for correcting and error of the data read out form said memory unit in a unit data size of processing of data to be read out of or written into said memory, and a data erasure unit for erasing the data stored in said memory in a unit data size of erasure which is at least twice of the unit data size of processing.

* * * * *